(12) United States Patent
Sakai et al.

(10) Patent No.: US 9,971,144 B1
(45) Date of Patent: May 15, 2018

(54) ELECTROWETTING DISPLAY DEVICE WITH ELECTRODE AND ELECTRICAL CONNECTOR ARRANGEMENT

(71) Applicant: Amazon Technologies, Inc., Seattle, WA (US)

(72) Inventors: Toru Sakai, Waarle (NL); Abhishek Kumar, Tilburg (NL)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days. days.

(21) Appl. No.: 15/188,827

(22) Filed: Jun. 21, 2016

(51) Int. Cl.
*G02B 26/00* (2006.01)
*G09G 3/34* (2006.01)
*G02B 26/02* (2006.01)

(52) U.S. Cl.
CPC ......... *G02B 26/005* (2013.01); *G02B 26/004* (2013.01); *G09G 3/348* (2013.01); *G09G 3/3433* (2013.01); *G02B 26/02* (2013.01); *G09G 3/34* (2013.01); *G09G 2300/0426* (2013.01); *Y10T 29/49117* (2015.01)

(58) Field of Classification Search
CPC .. G02B 26/004; G02B 26/006; G02B 26/007; G02B 26/02; G02B 2207/115; H01L 29/66742; G09G 3/00; G09G 3/10; G09G 3/20; G09G 3/34; G09G 3/3433; G09G 3/348; G09G 2300/0421; G09G 2300/0426; G09G 2300/0809; Y10T 29/49117

USPC .............. 359/228, 245, 253, 290, 291, 295; 345/30, 31, 41, 42, 55, 60, 84
See application file for complete search history.

(56) References Cited

U.S. PATENT DOCUMENTS

| | | | | |
|---|---|---|---|---|
| 8,730,555 | B2 * | 5/2014 | Aubert ................. | G02B 26/004 359/290 |
| 9,207,449 | B2 * | 12/2015 | Chung ................. | G02B 26/005 |
| 9,223,127 | B2 * | 12/2015 | Giraldo ................ | G02B 26/005 |
| 9,449,563 | B2 * | 9/2016 | Feenstra .............. | G02B 26/005 |
| 9,557,558 | B2 * | 1/2017 | Giraldo ................ | G02B 26/005 |
| 2017/0004781 | A1 * | 1/2017 | Feenstra .............. | G02B 26/005 |

* cited by examiner

*Primary Examiner* — Loha Ben
(74) *Attorney, Agent, or Firm* — EIP US LLP

(57) ABSTRACT

An electrowetting display device comprises a first fluid, an array of electrowetting elements, each respectively comprising a portion of the first fluid, and a first support plate. The first support plate comprises a first region extending along a first edge of the first support plate and a second region extending along a second edge of the first support plate. The first and second regions are located outside the array of electrowetting elements, and the first region is non-overlapping the second region. A first electrode is located in the first region and an electrical component is located in the second region. A second support plate of the electrowetting display device includes a second electrode in electrical contact with a second fluid immiscible with the first fluid. An electrical connector connects the first electrode to the second electrode and a conductor connects the first electrode to the electrical component.

23 Claims, 11 Drawing Sheets

ELECTROWETTING DISPLAY DEVICE WITH ELECTRODE AND ELECTRICAL CONNECTOR ARRANGEMENT

BACKGROUND

A known electrowetting display device includes an array of electrowetting elements. A support plate has a region outside the array of electrowetting elements in which a multitude of electrical components are arranged. Contact between electrical components that are intended to be electrically isolated from each other can occur, which can cause the electrowetting display device to malfunction.

It is desirable to provide an electrowetting display device that is more reliable.

DETAILED DESCRIPTION

Examples will be described below in relation to an electrowetting display device with an array of electrowetting elements. A first support plate of the electrowetting display device has a first region extending along a first edge of the first support plate and a second region extending along a second edge of the first support plate. The first and second regions are located outside the array of electrowetting elements and the first region is non-overlapping the second region. A first electrode is located in the first region and an electrical component, such as a voltage generator, display driver, driver stage, distributor or display controller, is located in the second region. An electrical connector connects the first electrode to a second electrode. The electrical connector itself may therefore be arranged in or to contact the first region of the first support plate and outside or not in contact with the second region of the first support plate.

In examples, the electrical connector is applied as a paste on the first support plate or a second support plate. With the electrical connector applied outside the second region of the first support plate, e.g. separated from or located at a distance from the electrical component in the second region of the first support plate, the extent to which the electrical connector as a paste migrates to contact the electrical component may be reduced, reducing the likelihood of electrical short circuits occurring. Malfunctions of the electrowetting display device, for example due to electrical defects, can therefore be reduced or eliminated. Electrowetting display devices according to examples described herein may therefore be more reliable than a known electrowetting display device.

The structure of an example apparatus including an electrowetting display device will first be described with reference to FIG. 1. Then, an example electrowetting element and its operation as part of an electrowetting display device will be described with reference to FIGS. 2 and 3. Then, the operation of an array of electrowetting elements according to an example will be described with reference to FIG. 4. Subsequently, the arrangement of the electrodes and the electrical connector according to examples will be described in more detail.

Figure 1:
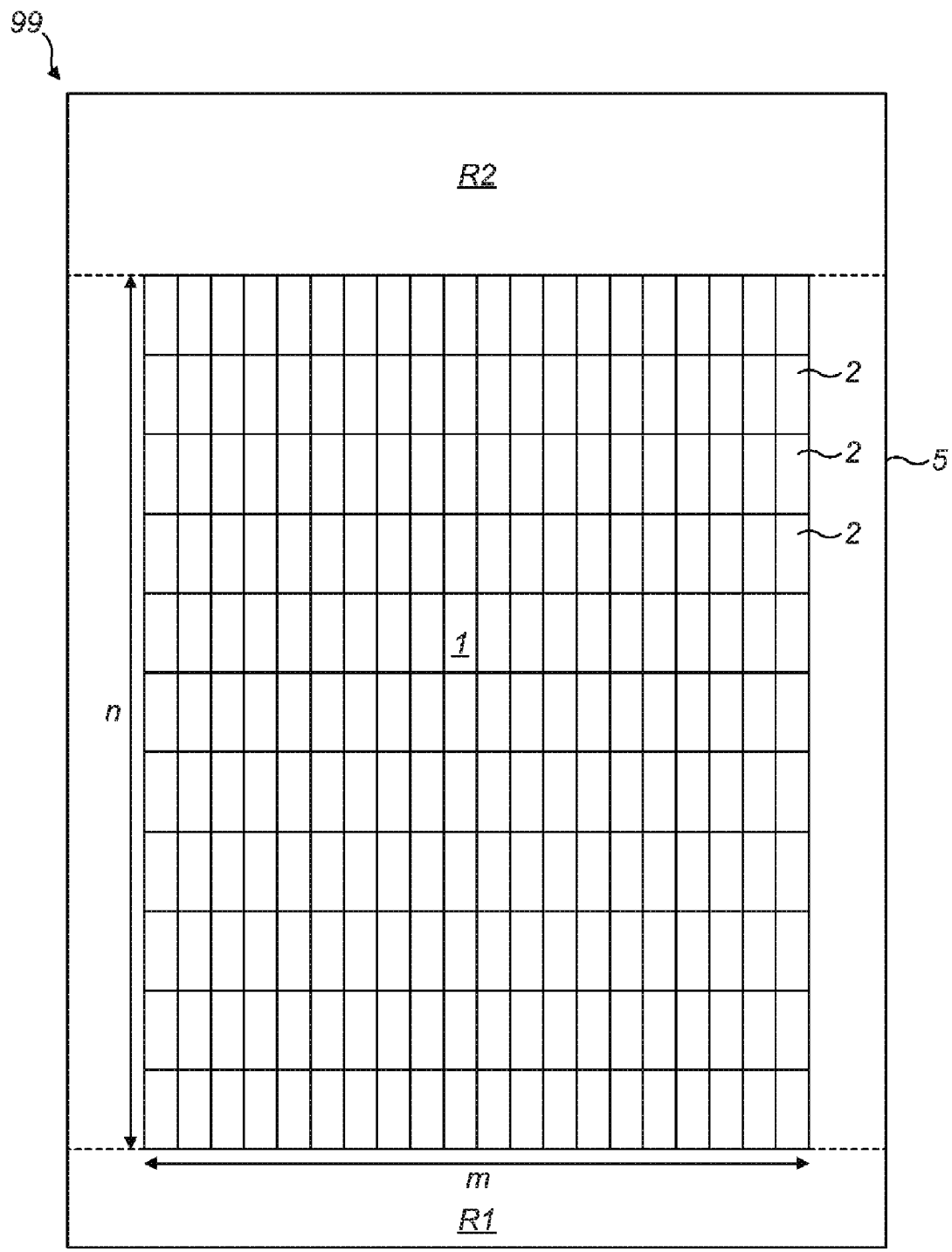
FIG. 1 shows schematically a plan view of an example apparatus.

FIG. 1 shows schematically an apparatus 99 including an electrowetting display device 1 according to examples, which includes a plurality of electrowetting elements 2. Such electrowetting elements may otherwise be considered to be display elements or picture elements, each configurable to provide a display effect which together form an image displayed by display device. An electrowetting element may in some examples be considered a pixel and in other examples a sub-pixel.

The electrowetting elements 2 in examples such as those of FIG. 1 are arranged in an array or matrix of n rows and m columns, where each of n and m are integers. Outside the array of electrowetting elements 2, a first support plate 5 of the electrowetting display device 1 has a first region R1 along a first edge of the first support plate 5 and a second region R2 along a second edge of the first support plate 5. The first region R1, the second region R2 and the components located in these regions are detailed further below. The electrowetting display device 1 and electrowetting elements 2 are for example as described below, for example with reference to FIGS. 2 to 4. In further examples, an apparatus such as the apparatus 99 of FIG. 1 may instead include an electrowetting display device or electrowetting elements according to other examples described herein, such as the example electrowetting display devices 101, 201 of FIGS. 10 and 11.

The apparatus 99 of FIG. 1 is for example a portable, for example mobile, device such as an electronic reader device such as a so-called "e-reader", a tablet computing device, a laptop computing device, a mobile telecommunications device, a watch or a satellite navigation device; the apparatus may alternatively be a display screen for installation in any machine or device requiring a display screen, for example a consumer appliance. The apparatus 99 may include a housing element (not shown) though other examples are envisaged without this housing element. The housing element is for example formed of moulded plastic and may be an exterior piece of an e-reader housing. The housing element typically has a window, which is for example an aperture, opening, gap, optically transparent layer or other feature in the housing element through which at least light in the visible spectrum may be transmitted. The window is sized and shaped to in examples correspond with a size and shape of the display device, more specifically the array or matrix of electrowetting elements. Thus, a display effect output by the electrowetting elements is viewable through the window. In some examples, such as where the electrowetting elements operate by reflecting light for example from the surrounding environment of the display device, the window also permits ambient light to be transmitted through the window and onto the electrowetting elements. Hence the housing element acts for example as a frame for the array or matrix of electrowetting elements.

The apparatus 99 of FIG. 1 typically also includes at least one processor and at least one memory. A system diagram illustrating an example of a basic hardware architecture of the apparatus 99 is described in more detail with reference to FIG. 12.

Figure 2:
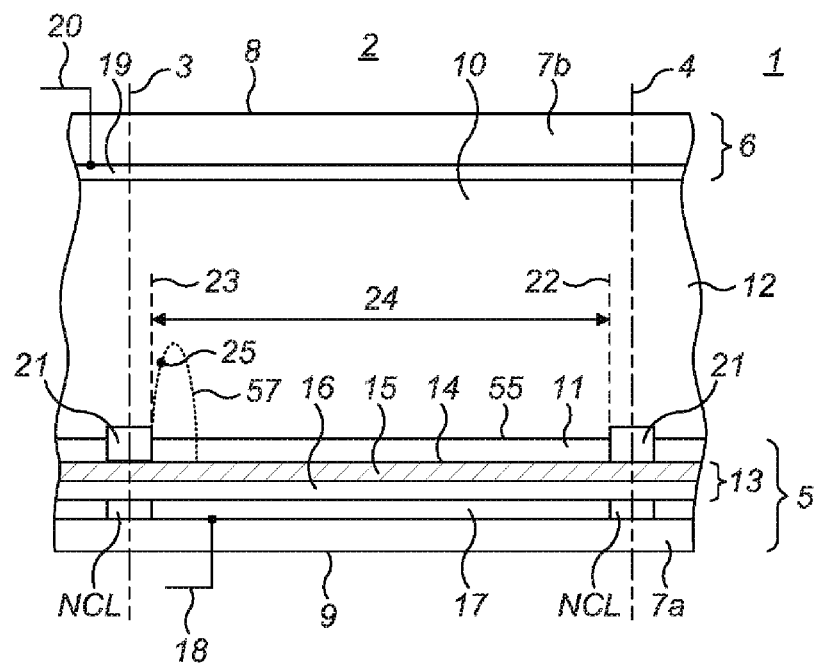
FIG. 2 shows schematically a cross-section of a part of an example electrowetting display device.

FIG. 2 shows a diagrammatic cross-section of part of an example of an electrowetting display device 1, such as an electrowetting display device 1 for incorporation in the apparatus 99 of FIG. 1. FIG. 2 is schematic in nature; the electrowetting display device 1 illustrated may in examples include further features not illustrated in FIG. 2. For example, the electrowetting display device 1 may include circuitry such as that of any of FIGS. 6 to 9. The electrowetting display device 1 may be referred to as a display device and includes a plurality of electrowetting elements 2. The electrowetting element 2 shown in FIG. 2 is for example a first electrowetting element, described further below, such as the first electrowetting element 64 of FIGS. 6 and 7. The lateral extent of the electrowetting element is indicated in the Figure by two dashed lines 3, 4. The electrowetting elements comprise a first support plate and a second support plate such as the first support plate 5 and the second support plate 6 referred to with reference to FIG. 1, which also form part of the electrowetting display device 1. The support plates may be separate parts of each electrowetting element, but the support plates may instead be shared in common by the plurality of electrowetting elements. The support plates may each include a glass or polymer substrate 7a, 7b and may be rigid or flexible.

The display device has a viewing side 8 on which an image or display effect formed by the display device can be viewed and a rear side 9. In the Figure a side of the first support plate 5 corresponds with the rear side 9; a side of the second support plate 6 corresponds with the viewing side 8; alternatively, in other examples, a side of the first support plate may correspond with the viewing side. The display device may be of the reflective, transmissive or transflective type. The display device may be an active matrix driven display device. The plurality of electrowetting elements may be monochrome. For a color display device the electrowetting elements may be divided in groups, each group having a different color; alternatively, an individual electrowetting element may be able to show different colors.

The second support plate 6 is positioned such that a first fluid 11 and a second fluid 12 are located between the first support plate 5 and the second support plate 6, in the space 10. In the example of FIG. 2, each electrowetting element 2 includes a respective portion of the first fluid 11 and the second fluid is shared by the array of electrowetting elements. However, in other examples, each electrowetting element may include a portion of the second fluid, for example where the second fluid is not shared by the array of electrowetting elements. At least one of the first and second fluids may be a liquid. The second fluid is immiscible with the first fluid. Therefore, the first fluid and the second fluid do not substantially mix with each other and in some examples do not mix with each other to any degree. The immiscibility of the first and second fluids is due to the properties of the first and second fluids, for example their chemical compositions; the first and second fluids tend to remain separated from each other, therefore tending not to mix together to form a homogeneous mixture of the first and second fluids. Due to this immiscibility, the first and second fluids meet each other at an interface which corresponds with a boundary between the volume of the first fluid and the volume of the second fluid; this interface or boundary may be referred to as a meniscus. With the first and second fluids substantially not mixing with each other, it is envisaged in some examples that there may be some degree of mixing of the first and second fluids, but that this is considered negligible in that the majority of the volume of the first fluid is not mixed with the majority of the volume of the second fluid.

The second fluid is electrically conductive or polar and may be water, or a salt solution such as a solution of potassium chloride in water. In examples, the second fluid is polar and in some examples is electrically conductive, but in other examples is not electrically conductive. The second fluid may be transparent. The first fluid is typically electrically non-conductive and may for instance be an alkane like hexadecane or may be an oil such as silicone oil. The first fluid is therefore non-polar in at least some examples.

The first fluid may absorb at least a part of the optical spectrum. The first fluid may be transmissive for a part of the optical spectrum, forming a color filter. For this purpose the first fluid may be colored by addition of pigment particles or a dye. Alternatively, the first fluid may be black, for example absorb substantially all parts of the visible spectrum, or reflecting. A reflective first fluid may reflect the entire visible spectrum, making the layer appear white, or part of it, making it have a color. In some examples, the first fluid is black and therefore absorbs substantially all parts of the optical spectrum, for example in the visible light spectrum. In other examples, the first fluid is another color than black and absorbs another part of the optical spectrum, for example a sub-range of wavelengths within the visible spectrum. In other examples, the display device includes electrowetting elements having first fluids which are respectively red, green or blue, or cyan, magenta and yellow to provide a full color display. Typically, by absorbing substantially all parts of the optical spectrum, there is nonetheless a degree of variation. Therefore, the first fluid may not absorb all wavelengths, but the majority of wavelengths within a given spectrum such as the visible spectrum, so as to perform the function of the first fluid in the electrowetting element. The first fluid may therefore be configured to absorb substantially all light incident on the first fluid. For example the first fluid may absorb 90% or more of light in the visible spectrum and incident on the first fluid.

The first support plate 5 includes an insulating layer 13. The insulating layer may be transparent or reflective. The insulating layer 13 may extend between walls 21 of an electrowetting element 2. To avoid short circuits between the second fluid 12 and electrodes arranged under the insulating layer, layers of the insulating layer may extend uninterrupted over a plurality of electrowetting elements 2, as shown in the Figure. The insulating layer has a surface 14 facing the space 10 of the electrowetting element 2. In this example, the surface 14 is hydrophobic. The thickness of the insulating layer may be less than 2 micrometers and may be less than 1 micrometer. The surface is in contact with at least one of the first fluid or the second fluid, depending on the fluid configuration as described below.

The insulating layer may be a hydrophobic layer; alternatively, it may include a hydrophobic layer 15 and a further layer, such as a dielectric layer 16, with predetermined dielectric properties, the hydrophobic layer 15 facing the space 10, as shown in the Figure. The hydrophobic layer is schematically illustrated in FIG. 2 and may be formed of Teflon® AF1600. The dielectric layer 16 may have a thickness, taken in a direction perpendicular to the plane of the substrate, of between 5 nanometers and several micrometers, for example between 50 nanometers and 2 or 3 micrometers. In other examples the thickness may be between 50 nanometers and 500 nanometers. The dielectric layer may be made of an inorganic material like silicon oxide or silicon nitride.

The hydrophobic character of the surface 14 causes the first fluid 11 to adhere preferentially to the insulating layer 13, since the first fluid has a higher wettability with respect to the surface of the insulating layer 13 than the second fluid 12. Wettability relates to the relative affinity of a fluid for the surface of a solid. Wettability may be measured by the contact angle between the fluid and the surface of the solid. The contact angle is determined by the difference in surface tension between the fluid and the solid at the fluid-solid boundary. For example, a high difference in surface tension can indicate hydrophobic properties.

Each electrowetting element 2 includes an electrowetting element electrode 17 as part of the first support plate 5. In examples shown there is one such electrowetting element electrode 17 per electrowetting element, although in other examples some or all electrowetting elements may have more than one electrowetting element electrode. The electrowetting element electrode 17 is electrically insulated from the first and second fluids by the insulating layer 13; electrowetting element electrodes of neighboring electrowetting elements are separated by an electrically non-conductive layer NCL. In some examples, further layers may be arranged between the insulating layer 13 and the electrowetting element electrode 17. The electrowetting element electrode 17 can be of any desired shape or form, and may be made of the transparent conductive material indium tin oxide (ITO). The electrowetting element electrode 17 of an electrowetting element is supplied with voltage signals by a signal line 18, schematically indicated in the Figure.

A second signal line 20 is connected to a second electrode 19 that is in electrical contact with the conductive second fluid 12. Similarly to the electrowetting element electrode, the second electrode 19 may be made of ITO. The second electrode may be common to all elements, for example when they are fluidly interconnected by and share the second fluid, uninterrupted by walls. The electrowetting element 2 can be controlled by a voltage V applied between the signal lines 18 and 20 and hence between the electrowetting element electrode 17 and the second electrode 19, which is therefore a voltage applied to the electrowetting element. The electrowetting element electrodes on the substrate 7a are coupled to a display driving system, described further below. In a display device having the electrowetting elements arranged in a matrix form, the electrowetting element electrodes can be coupled to a matrix of control lines on the substrate 7a using the signal line 18. The signal line 20 may be coupled to a display driving system.

The first fluid 11 in this example is confined to an electrowetting element by walls 21 that follow the cross-section of the electrowetting element. The extent of the electrowetting element, indicated by the dashed lines 3 and 4, is taken between the center of the walls. The area of the surface 14 between the walls of an electrowetting element, indicated by the dashed lines 22 and 23, is called the display area 24, over which a display effect occurs. The display effect depends on an extent that the first fluid and the second fluid adjoin the surface corresponding with the display area, in dependence on the magnitude of the applied voltage V described above. The magnitude of the applied voltage V therefore determines the configuration of the first and second fluids within the electrowetting element. In other words, the display effect depends on the configuration of the first and second fluid in the electrowetting element, which configuration depends on the magnitude of the voltage applied between the electrodes of the electrowetting element. For example, for controlling the configuration of the first and second fluids, a specified potential, for example a constant or varying potential, may be applied to the second electrode in contact with the conductive second fluid 12 and the magnitude of a potential applied to the electrowetting element electrode 17 on the substrate 7a may be controlled. The display effect gives rise to a display state of the electrowetting element for an observer looking at the display device. When switching the electrowetting element from one fluid configuration to a different fluid configuration the extent of second fluid adjoining the display area surface may increase or decrease, with the extent of first fluid adjoining the display area surface decreasing or increasing, respectively. Thus, the display effect may in effect be controlled by controlling a configuration of the first fluid (and consequently the second fluid).

The first fluid 11 adjoins at least part of the display area 24. A size of the part of the display area adjoined by the first fluid depends on a voltage applied between the electrodes of the electrowetting element. In examples described herein, when a zero or substantially zero voltage is applied between the electrodes, for example when the electrowetting element is in an off state, the first fluid 11 forms a layer between the walls, as shown in FIG. 2 with the reference numeral 55. Typically, substantially zero in examples refers to a voltage which is minimal, for example as close to zero that the first fluid adjoins a maximum extent of the display area 24. Application of a voltage will retract the first fluid, for example against a wall as shown by the dashed shape 57 in FIG. 2. The controllable shape of the first fluid, in dependence on the magnitude of applied voltage, is used to operate the electrowetting element as a light valve, providing a display effect over the display area 24. For example, switching the fluids to increase adjoinment of the second fluid 12 with the display area 24 may increase the brightness of the display effect provided by the element.

This display effect determines the display state of the electrowetting element which an observer will see when looking towards the viewing side of the display device. The display device is capable of providing display states from black to white, including various intermediate grey states; in a color display device, the display state may also include color.

Figure 3:
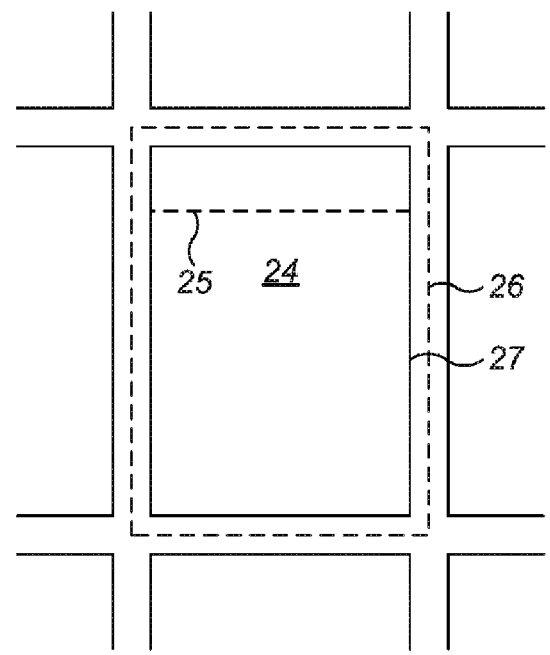
FIG. 3 shows schematically a plan view of the part of the example electrowetting display device of FIG. 2.

FIG. 3 shows a plan view of the electrowetting element of FIG. 2. The lateral dimension of the central electrowetting element in FIG. 3, corresponding to the dashed lines 3 and 4 of the electrowetting element 2 in FIG. 2, is indicated by the dashed line 26. Line 27 indicates the inner border of a wall; the line is also the edge, for example a perimeter, of the display area 24. The dashed line 25 marks the boundary between the first fluid 11 and the second fluid 12 when a voltage is applied to the electrowetting element 2 to retract the first fluid 11 against the wall 21 such that the first fluid 11 has the dashed shape 57.

Figure 4:
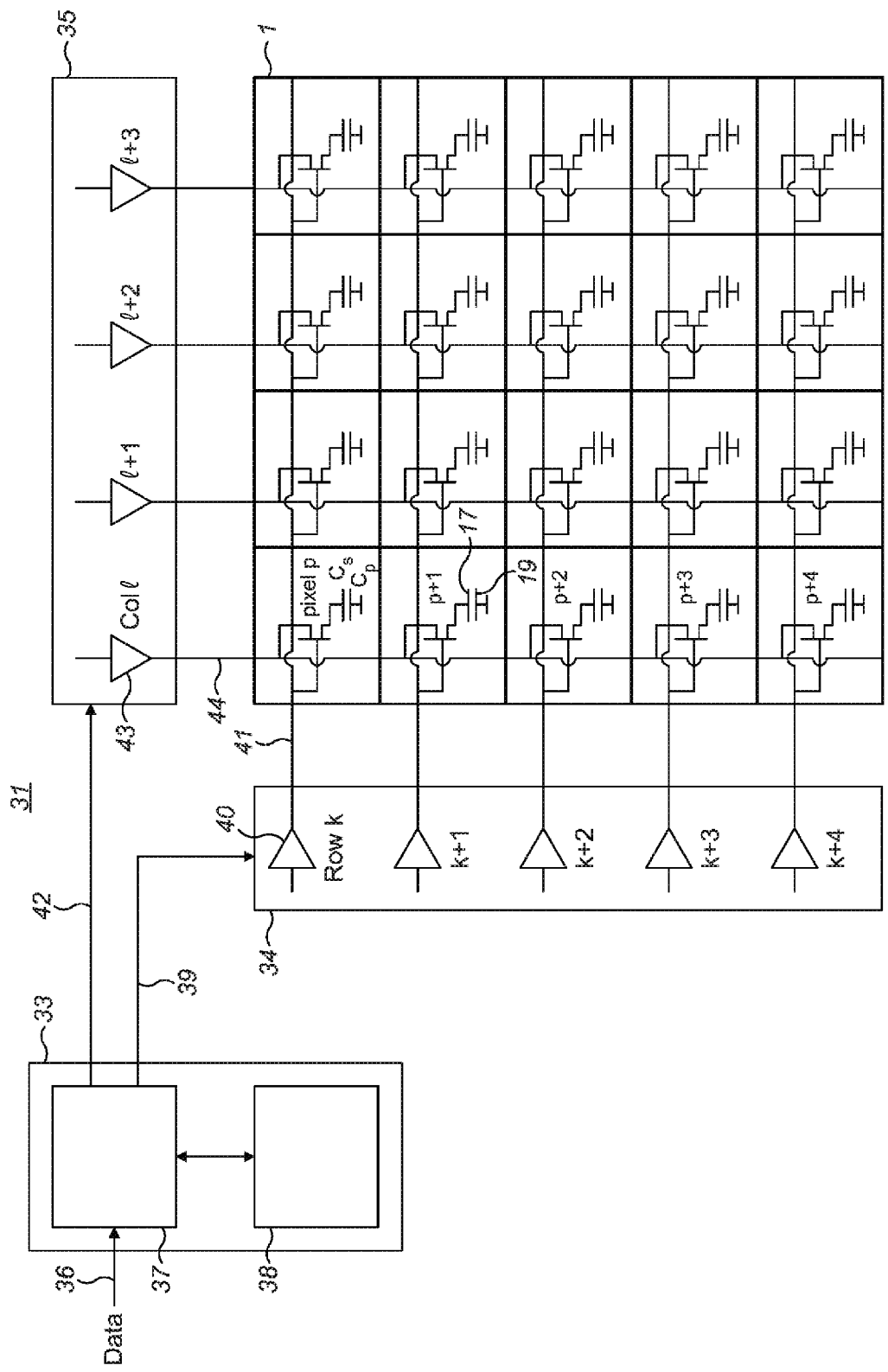
FIG. 4 shows schematically circuitry associated with the example apparatus of FIG. 1.

FIG. 4 shows schematically circuitry associated with the example apparatus 99 of FIG. 1. The apparatus 99 of FIGS. 1 and 4 is an example of a so-called active matrix drive type display apparatus. The apparatus 9 includes a display driving system and an electrowetting display device 1, which is for example similar to or the same as the electrowetting display device 1 described above with reference to FIG. 2; a corresponding description applies. The display driving system is for example part of a display device control subsystem described later and in this example includes a display controller or controller 33, a display row driver 34 and a display column driver 35. Data indicative of display states of the electrowetting elements, the display states for example representing a still image or video images, is received from an input line 36 to the display driving system. The display controller includes at least one processor 37 for processing the data entered on the input line 36. The processor is connected to at least one memory 38. The display controller prepares the data for use in the display device.

The at least one memory may store computer program instructions that are configured to cause the display apparatus to perform one or more of the methods of controlling a display device as described when being executed by the processor. The computer program instructions may be stored on a computer program product including a non-transitory computer-readable storage medium. Details of the at least one processor and the at least one memory are described further below with reference to FIG. 12.

An output of the processor 37 is connected by line 39 to the display row driver 34, which includes row driver stages 40 that transform signals to the appropriate voltages for the display device 1. Row lines 41 connect the row driver stages to respective rows of the display device 1 for transmitting the voltage pulses generated in the display row driver to electrowetting elements in each row of the display device, thereby providing a row addressing signal to each row of the display device. In other words, one or more voltage pulses for addressing one or more rows is transmitted over the row lines 41 corresponding to the rows to switching elements corresponding respectively to the electrowetting elements in the one or more rows. The display row driver 34 generates the voltage pulses used for addressing the rows of the display device, using information from the processor 37 to set a value of the pulse duration of the voltage pulses.

Another output of the processor 37 is connected by line 42 to the display column driver 35, which includes column driver stages 43 that transform signals to the appropriate voltages for the display device 1. Column lines 44 connect the column driver stages to the columns of the display device 1, providing a column signal to each column of the display device.

The display controller 33 determines which rows are selected for addressing and in which order. The selected rows are consecutively addressed by applying an addressing signal to each of these rows. The addressing may include the steps of determining a value for a first pulse duration corresponding to at least one voltage pulse to be applied to a row of electrowetting elements, generating the at least one voltage pulse having the first pulse duration and transmitting the at least one voltage pulse to the rows to be addressed. In examples where the electrowetting elements of a row are connected to the same row line, addressing a row for example refers to addressing one or more, for example each, electrowetting element of that row. When an electrowetting element is being addressed, the electrowetting element admits the column signal that is applied to the column line to which the electrowetting element is connected. The column signal for an electrowetting element is applied substantially simultaneously with the voltage pulse used for addressing the electrowetting element. The column signal may be considered to be applied substantially simultaneously with the voltage pulse for example where the column signal is present on the column line for at least the pulse duration of the voltage pulse.

In other examples, a column addressing signal may be applied to one or more, for example, each column of the display device to admit a signal level of a row signal to the electrowetting element electrode. In other words, the functions of the display row driver and display column driver may be swapped, with the display column driver used to generate a voltage pulse for addressing columns of the display device, for example to switch a transistor of each of the electrowetting elements of the column to a conducting state to pass the signal level of the display row driver to the electrowetting element electrode to set the corresponding electrowetting element in a desired display state.

The display drivers may comprise a distributor, not shown in FIG. 4, for distributing data input to the display driver over a plurality of outputs connected to the driver stages. The distributor may be a shift register. FIG. 4 shows the lines only for those columns and rows of the display device that are shown in the Figure. The display row drivers may be integrated in a single integrated circuit. Similarly, the display column drivers may be integrated in a single integrated circuit. The integrated circuit may include the complete driver assembly. The integrated circuit in examples, such as that of FIG. 4, is integrated on the first support plate, although in other examples the integrated circuit may be integrated on the second support plate instead. The integrated circuit may include the entire display driving system. Such an arrangement may be known as a "chip on glass" (COG) construction. In other examples a "chip on foil" (COF) construction may be used, where the display column drivers and/or display row drivers may be integrated on a foil, which is then arranged on the first or second support plate, which foil is connectable to circuit lines of the first or second support plate for driving the picture elements. The integrated circuit may include part or the entire display device control subsystem.

The display device 1 comprises a plurality of electrowetting elements arranged in a matrix or array of n rows, where n may be ≥2, for example larger than one. The matrix may have an active matrix configuration. The matrix may have m columns, where m may be ≥2; the total number of electrowetting elements in this example is n×m. FIG. 4 shows electrowetting elements for five rows, labelled k to k+4 and four columns labelled l to l+3. The total number of rows and columns for common display devices may range between a few hundred and a few thousand. The electrowetting elements of column l are labelled p to p+4. Each electrowetting element may have the same construction as the electrowetting element 2 in FIG. 1.

As noted above, FIG. 4 shows a few electrical parts of the electrowetting elements. Each electrowetting element of the display device 1 includes an active element in the form of one or more switching elements. The switching element of an electrowetting element is not necessarily located within the lateral extent of the electrowetting element (for example between the dashed lines 3, 4 as shown in FIG. 2), although it may be. The switching element may be a transistor, for example a thin-film transistor (TFT), or a diode. The electrodes of the electrowetting element are indicated as an electrowetting element capacitor Cp formed by the electrowetting element electrode 17 and the second electrode 19. The electrowetting element electrode 17 may be considered to correspond to a first plate of the electrowetting element capacitor Cp and the second electrode 19 may be considered to correspond to a second plate of the electrowetting element capacitor Cp. A line connecting the second electrode 19 of the electrowetting element capacitor Cp to a common potential, in this example ground, is the common signal line 20, which may include or be formed of the electrical connector, first electrode and conductor described later. A line connecting the electrowetting element electrode 17 of the electrowetting element capacitor Cp to the transistor is the signal line 18 shown in FIG. 2. The electrowetting element may include a storage capacitor Cs for storage purposes or for making the duration of the holding state or the voltage applied to the element uniform across the display device. The storage capacitor Cs is arranged in parallel with Cp and is not separately shown in FIG. 4. A first plate of the storage capacitor Cs may be connected to a storage control line to which a potential Vstorage is applied and a second plate of the storage capacitor Cs may be connected to the switching element connected to the electrowetting element electrode 17 of the electrowetting element capacitor Cp. For example both the electrowetting element electrode 17 of the electrowetting element capacitor Cp and the second plate of the storage capacitor Cs may be connected to a drain of a TFT.

As explained above, in examples, the display column driver 35 provides the signal levels corresponding to the input data for the electrowetting elements. The display row driver 34 provides the signals for addressing the row of which the electrowetting elements are to be set in a specific display state. In examples, addressing a row for example refers to applying a signal on the signal line of the row that switches a transistor of each of the electrowetting elements of the row to a conducting state of the transistor. Each row of the n rows of the display device is addressable by a signal such as a voltage pulse; the voltage pulse is applied to a switching element of each of the electrowetting elements in the addressed row for switching the switching element.

The addressing of rows is part of the addressing of electrowetting elements in an active matrix display device. A specific electrowetting element is addressed by applying a potential to the column in which the specific electrowetting element is located and applying a voltage pulse to the row in which the specific electrowetting element is located.

When the transistor of an electrowetting element receives at its gate a voltage pulse of its row addressing signal, the transistor becomes conducting and it passes the signal level of its display column driver to the electrowetting element electrode 17 of the electrowetting element, and to the second plate of the storage capacitor Cs in examples with a storage capacitor Cs. In examples, a voltage pulse is a rapid, transient change in potential from a baseline value to a higher or lower value, followed by a rapid return or change to the baseline value. The time period between the two subsequent voltage changes of the voltage pulse is called a pulse duration. After the transistor has been switched off, so the transistor is no longer conducting, the voltage over the cell will be substantially maintained until the transistor is switched on again by the next row addressing signal for the electrowetting element. The time during which the transistor is switched off may be referred to in examples as the holding state of the element. In this active matrix driving method the electrodes of the electrowetting elements are connected to the driver stages briefly at the start of a period during which they show a certain display effect. During this connection, a voltage related to the desired display effect is applied between the electrowetting element electrode and the second electrode. After the electrowetting element is disconnected from the driver stage, the voltage between the electrowetting element electrode and the second electrode is substantially maintained by one or more capacitors during the period during which the electrowetting element shows the display effect, for example by the electrowetting element capacitor Cp and by the storage capacitor Cs. The period during which the voltage is substantially maintained is determined in these examples by the combined capacitance and leakage currents of the two capacitors Cp, Cs. By using a storage capacitor Cs as well as the electrowetting element capacitor Cp, the voltage may be substantially maintained for a longer duration than otherwise, although in other examples the electrowetting element need not include a storage capacitor Cs. A voltage may be considered to be substantially maintained for example where a change in the voltage is sufficiently small that it does not cause a visible change in a display state of an electrowetting element. For example, a change in display effect, for example transmission or reflectance, of less than 10% is typically not visible to a viewer. The method is called 'active', because the electrowetting element contains at least one active element, for example a transistor.

Figure 5:
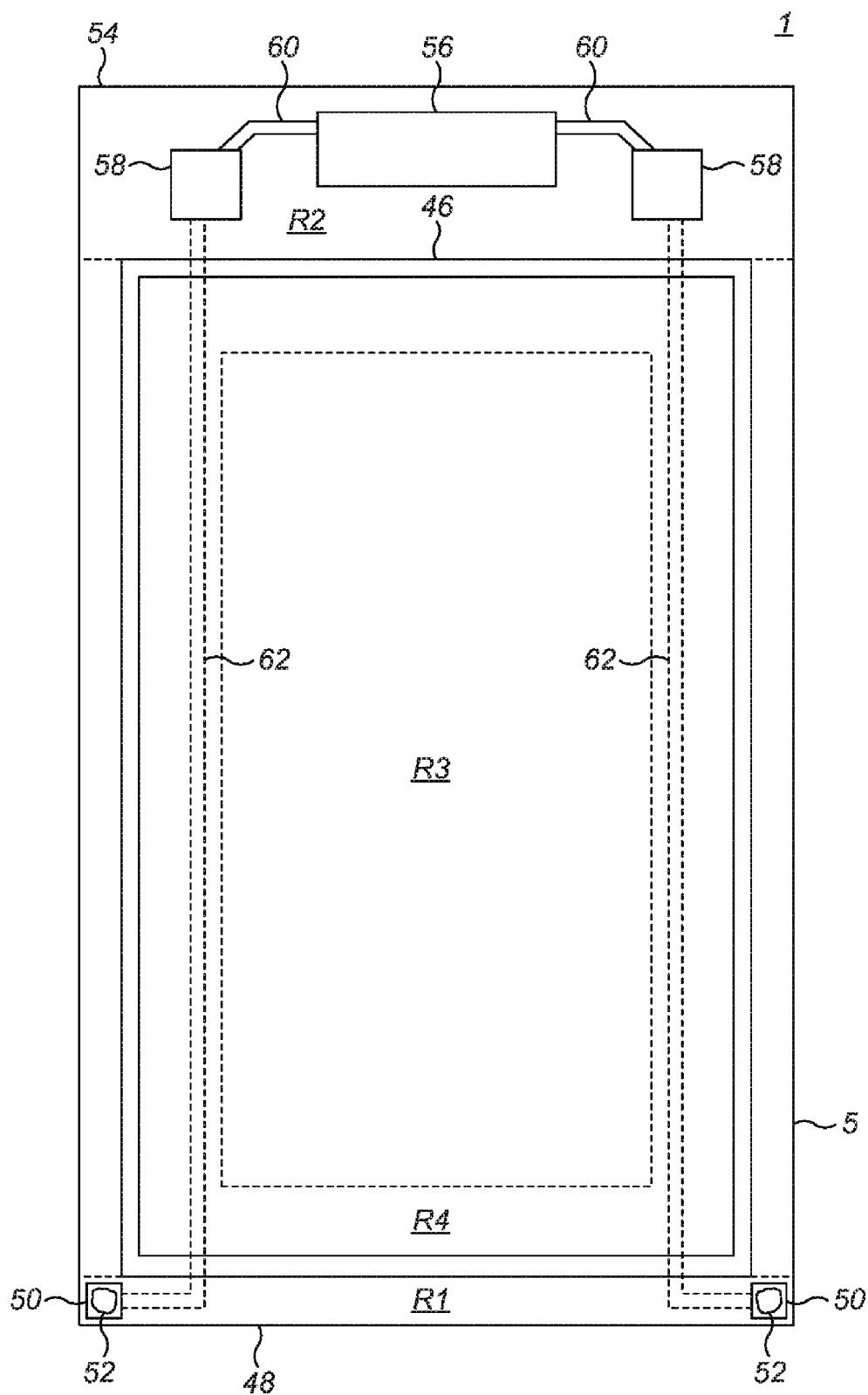
FIG. 5 shows schematically a plan view of an example electrowetting display device.

FIG. 5 will now be used to describe further details of the example electrowetting display device 1 of FIGS. 2 to 4, shown schematically in plan view. FIG. 5 does not necessarily illustrate all components present in the example electrowetting display device 1; FIG. 5 is merely schematic and the electrowetting display device 1 may include further components not shown in the Figure. The electrowetting display device 1 of FIG. 5 includes an array of electrowetting elements (described further below). The array of electrowetting elements in FIG. 5 is surrounded by a seal 46, which is between the first support plate 5 and the second support plate, and for example connects the first support plate 5 to the second support plate. The seal may be considered to surround a periphery, for example an outer boundary or perimeter, of the array or matrix of electrowetting elements. The seal may therefore laterally bound, e.g. follow or go around a lateral extent of, the array of electrowetting elements. For example, the seal may be located such that it is beyond and outside, e.g. further from a central region of a surface of the first support plate or the second support plate, the array of electrowetting elements. For example, the seal may border, encircle or ring the array of electrowetting elements. The seal 46 may be any suitable shape in plan view, e.g. circular, ring-shape, rectangular, square or a non-regular or asymmetric shape, and will be described further below. In other examples, however, the seal may be arranged in a different location or the seal may be absent.

The first support plate 5 in examples such as that of FIG. 4 has a first region R1 extending along a first edge 48 of the first support plate 5. The first edge 48 of the first support plate is for example a lateral side of the first support plate. For example, the first edge may correspond with a border or boundary at which a first side of the first support plate closest to the viewing side 8 of the display device meets or contacts a second side of the first support plate that is roughly perpendicular to a plane of the viewing side 8, for example within 20 degrees of perpendicular to the plane of the viewing side 8. The first region R1 in examples is a three-dimensional volume, two-dimensional area, portion or section of the first support plate 5 that at least partly overlaps, aligns, is coincident with or includes the first edge 48 of the first support plate 5. The first region R1 need not extend along the entirety or all of the first edge 48 of the first support plate 5 but may in some examples. In the example of FIG. 5, the first region R1 is outside both the array of electrowetting elements and the seal 46, although in other examples the first region R1 may be surrounded by or inside the seal 46, for example closer to a central portion of a surface of the first support plate than the seal 46. The first region R1 may immediately surround the array of electrowetting elements and/or the seal, with no other components located between the first region R1 and the array and/or the seal, or there may be one or more other components located between the first region R1 and the array and/or the seal.

The first region R1 of the first support plate 5 may be considered to be a portion of a border region surrounding the array of electrowetting elements and, in some examples, the seal. For example, the border region may be a region of the electrowetting display device that is further from a central region of a surface of the first or second support plates than the array of electrowetting elements and the seal. The border region may fully surround or be continuous around the array or seal or there may be parts of the array or seal that are not surrounded by the border region. For example, at least part of the array or seal may be formed at an extremity of the electrowetting display device.

Various electrical or electronic components for use in controlling the array of electrowetting elements, for example to provide a desired display effect, may be arranged in the border region. In examples, a first electrode 50 is located in the first region R1 of the first support plate 5. The first electrode 50 is typically an electrically conductive element and may be part of one or more control lines or electrodes for connecting electrowetting elements of the array of electrowetting elements to one or more electrical components, such as the display driving system or display driver, or for connecting one or more electrical components to other components of the display device such as the second electrode 19. In the example of FIG. 5, the first electrode 50 is formed as an outermost layer of the first support plate 5, with the surface of the first support plate 5 in a portion of the first region R1 where the first electrode 50 is arranged being the surface of the first electrode 50. However, in other examples, the first electrode 50 may not be an outermost layer of the first support plate. For example, there may be one or more other elements or layers between a surface of the first support plate and the first electrode 50. In such cases, the first electrode 50 may be connected to a surface of the first support plate by a via or contact hole in the one or more elements or layers or by an electrically conductive element such as a line or further electrode.

Figure 14:
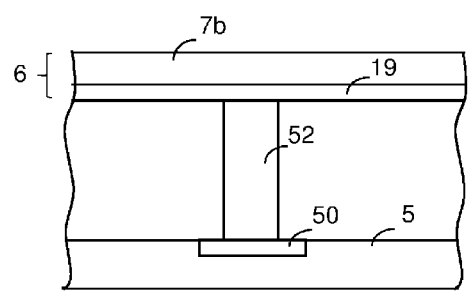
FIG. 14 shows schematically an electrical connector connecting a first electrode to a second electrode.

The first electrode 50 may be connected to the second electrode 19, described above with reference to FIG. 2, using an electrical connector 52, for example as illustrated in FIG. 14. For example, a first portion, such as a first end, of the electrical connector 52 may be in contact with the first electrode 50 and a second portion, such as a second end, of the electrical connector 52 may be in contact with the second electrode 19. In this way, the electrical connector 52 may directly connect the first electrode 50 to the second electrode 19, for example with no intervening elements or connectors. Alternatively, the electrical connector 52 may indirectly connect the first and second electrodes 50, 19. For example, the first portion of the electrical connector 52 may be in contact with the first electrode 50 and the second portion of the electrical connector 52 may be in contact with the second signal line 20, which is connected to the second electrode 19. In other examples, the first electrode 50 and the electrical connector 52 may be considered to be part of the second signal line 20 that is connected to the second electrode 19.

The electrical connector for example spans or bridges a gap or separation between the first and second support plates. The electrical connector may be elongate between the first and second support plates. For example a length of the electrical connector from the first to the second support plate larger than a width of the electrical connector perpendicular to the length. Typically, the electrical connector may be roughly cylindrical in shape, for example with a cross-sectional diameter that varies by less than 20% over the length of the electrical connector.

By connecting the first electrode 50 to the second electrode 19 with the electrical connector 52, a potential may be applied to the second electrode 19, for example from an electrical component such as a display driving system, e.g. from a display driver arranged in the driver contact area, which will be described further below. For example, the electrical component may include a voltage generator configured to apply a potential, for example a constant or varying potential, to a conductor 62 for applying to the second electrode 19 using the first electrode 50 and the electrical connector 52. The conductor 62 is described in further detail below. A display driver such as the display drivers described with reference to FIG. 4 may be used as the voltage generator or source. In other examples, the voltage generator or voltage source may be or include a timing and control printed circuit board (PCB), for example connected to the first electrode 50 using a foil, such as a flexible foil. The first electrode 50 may therefore be considered to be a common contact area, for example as the first electrode 50 may be used to provide a potential to the second electrode 19, which in examples is shared in common by a plurality or all of the electrowetting elements of the array. A varying potential may be applied to the electrowetting element electrodes in dependence on the display effect for the respective electrowetting element to display. The second electrode 19 is in contact with the second fluid so that a voltage may be applied between the second fluid and the electrowetting element electrodes of the first support plate 5. In further examples, other electrical components such as a driver stage, a distributor or a display controller, in addition to a display driver and/or a timing and control printed circuit board, may be configured for use in applying a potential to the conductor 62 for applying to the second electrode 19.

The electrical connector in examples includes silver particles. For example, the electrical connector may include conductive silver flakes CW2200 from Chemtronics, 8125 Cobb Center Drive, Kennesaw, Ga. 30152, USA. These silver particles are typically part of a paste that also includes a carrier fluid that evaporates after the electrical connector is deposited in the desired location. In other examples, the electrical connector may include at least one of: silver particles, electrically conductive particles, an adhesive, balls comprising gold such as solid gold balls, or balls comprising a gold surface. For example, the balls comprising a gold surface may be plastic balls coated with a gold layer. In examples in which the electrical connector includes an adhesive, the electrical connector may perform a dual function of electrically connecting the first electrode and the second electrode and also adhering or mechanically connecting the first support plate and the second support plate together. Where the electrical connector includes balls, the diameter of the balls may be within 20% of the desired distance between the first and second support plates in the electrowetting display device. For example, the balls may have a diameter of approximately 24 micrometers, e.g. 24 micrometers within manufacturing tolerances, and the desired distance between the first and second support plates may have a diameter of approximately 20 micrometers, e.g. 20 micrometers within manufacturing tolerances. The balls may be deformable, for example so that the balls may be compressed to a diameter corresponding to the desired distance between the first and second support plates when the first and second support plates are brought together during manufacture of the display device. This for example may help ensure that the balls remain in contact with the first and second electrodes during use of the display device.

In examples such as that of FIG. 5, the first support plate has a second region R2 extending along a second edge 54 of the first support plate 5. The second region R2 may be similar to the first region R1 but arranged along a different edge of the first support plate 5 than the first region R1. Similarly, the second edge 54 may be similar to the first edge 48 but along a different lateral side of the first support plate 5. The first region R1 and the second region R2 are non-overlapping in examples. For example, the first region R1 and the second region R2 may not extend over each other or may not overlap or cover each other. For example, the first region and the second region may be separate, distinct regions, portions, three-dimensional volumes or two-dimensional areas of the first support plate. The first region may, for example, not encompass or be coincident with the second region. The first and second regions R1, R2 of the first support plate 5 may be separated or disconnected from each other, for example with a further region of the first support plate 5 lying between the first and second regions R1, R2. Alternatively, the first and second regions R1, R2 may meet or contact each other, for example at a notional boundary, interface or intersection. In the example of FIG. 5, the first edge is opposite the second edge. For example, the first edge is across or on the other or far side of the first support plate from the second edge. In such cases, there may be an intervening edge between or connecting the first edge and the second edge. In other examples, the first edge may contact the second edge at a corner of the first support plate. For example, the first edge may join or meet the second edge at a border or interface coinciding with a corner of the first support plate.

An electrical component is located in the second region in examples. As explained above, the electrical component may be a voltage generator, for example a display driver. The electrical component may also or additionally include a driver stage, a distributor or a display controller. An electrical component is for example a component that is electrically conductive, such as an electrode, conductor or control line, or that is powered by electricity. Electronic components may be considered to be a subset of electric components and typically have processing or decision making capability, either with or without software, for example using logic gates. For example, an electronic component may generally considered to be a component that uses electricity to manipulate or control electrical energy. In examples, the electrical component located in the second region may be an electronic component. In the example of FIG. 5, there is a driver contact area 56 for a display row driver and a display column driver, which are part of a display driving system. The display row driver and display column driver may be as described above with reference to FIG. 4. Thus, in FIG. 5, the electrical component located in the second region R2 includes a display row driver and a display column driver.

With the first electrode located in the first region and the electrical component located in the second region, the likelihood of electrical short circuits occurring may be reduced, improving the reliability or lifetime of the electrowetting display device. For example, as the electrical connector connects the first electrode to the second electrode, the electrical connector itself may also be located to contact a first surface of the first region of the first support plate. The electrical connector may be considered to be localised to contact the first surface of the first support plate and may not contact other surfaces of the first support plate, for example a second surface of the first support plate in the second region. This arrangement may reduce the chance of movement or flow of the electrical connector from the first surface towards the second surface where the electrical component is located, for example if the electrical connector is deposited as a paste, fluid or liquid. Short circuits caused by contact between the electrical connector and the electrical component may therefore be reduced or avoided.

The display driving system in examples such as that of FIG. 5 is connected to a further contact area 58 to apply a potential to the first electrode 50 using the conductor 62 (described further below). In the example of FIG. 5, the display driving system is connected to the further contact area 58 with a flexible foil 60, although in other examples, the display driving system or other electrical component may instead be connected to the further contact area 58 using one or more electrodes, control lines, or cables, which may be flexible or rigid. The further contact area 58 may be part of or connected to one or more control lines or electrodes for connecting electrical components such as the display driving system or display driver to electrowetting elements of the array of electrowetting elements. In other examples, the electrowetting elements are connected to electrical components, such as the display driving system or the display driver, using other electrodes or control lines than the further contact area 58. In such cases, the further contact area 58 may be used solely to connect the electrical component to the first electrode 50, for example using the conductor 62. Alternatively, the electrowetting display device may not include a further contact area 58 and the electrical component may be connected directly to the first electrode 50 using the conductor 62.

As explained above, the electrowetting display device in examples includes a conductor connecting the first electrode to the electrical component. FIG. 5 shows such an example. In FIG. 5, the conductor 62 extends between the first electrode 50 and the further contact area 58, which is connected using the flexible foil 60 to the display drivers arranged in the driver contact area 56. The conductor 62 may be similar to the first electrode 50. For example, the conductor 62 may itself be an electrode and/or may be or comprise any suitable electrically conductive material and may be rigid or flexible. The first electrode and conductor may, for example, be formed as a strip of metal, for example having an elongate and flattened form, e.g. a form which is relatively thin in thickness compared with a length and width dimension. The conductor may directly connect the first electrode to the electrical component, such that the conductor is in contact with both the first electrode and the electrical component, or the conductor may indirectly, for example using other elements or components such as the further contact area 58 and the flexible foil 60, connect the first electrode and the electrical component. The first electrode and the conductor may be continuous; they may for example be considered to be portions of the same electrode. In such cases, the first electrode may be considered to be the part or portion of the electrode that is located or positioned in the first region of the first support plate and the conductor may be considered to be the part or portion of the electrode that is located outside the first region of the first support plate.

In examples such as that of FIG. 5, the conductor 62 is located at least partly in the array of electrowetting elements. The conductor may be considered to be at least partly in the array of electrowetting elements where the conductor is within or at least partly within an electrowetting element of the array of electrowetting elements or where the conductor is at least partly located in a portion or volume of the first support plate overlapped or covered by a surface of the first support plate that is in contact with a portion of the first fluid of an electrowetting element of the array.

In the example of FIG. 5, the conductor 62 is present in the first region R1 to connect to the first electrode 50. The conductor 62 also passes under a first side of the seal 46 at the bottom of the display device 1 as illustrated in FIG. 5, and is present in the array of electrowetting elements, which in this example are surrounded by the seal 46. The conductor 62 is also present under a second side of the seal 46 at the top of the display device 1 as shown in FIG. 5 and in the second region R2, to connect to the common contact area 58. Thus, in this example, a portion of the conductor 62 is located to pass through electrowetting elements located between the first side of the seal 46 and the second side of the seal 46. In this example, the first and second sides of the seal are opposite each other but in other examples, the first and second sides of the seal contact or meet each other. For example, the conductor may be bent or curved to pass under the first and second sides of the seal if they are neighbouring or adjacent to each other.

The conductor may be located beneath one or more layers of the first support plate 5, for example beneath, covered or overlapped by at least the hydrophobic layer or insulating layer described above with reference to FIG. 2. For example, the conductor may be located between a substrate and a hydrophobic layer of the first support plate 5, such as the substrate 7a and the hydrophobic layer 15 described with reference to FIG. 2. FIG. 5 shows such an example: in FIG. 5, the conductor 62 is illustrated with a dashed line as, in this example, the conductor 62 is beneath the hydrophobic layer and supported by the substrate. In such cases, the conductor may be protected by the hydrophobic layer, for example reducing the likelihood of damage to the conductor, e.g. due to contact with the first or second fluids of the electrowetting display device. However, in other examples, the conductor may be part of the outermost layer of the first support plate or the conductor may be between other layers of the first support plate 5 than the substrate and the hydrophobic layer.

In the example of FIG. 5, there are two first electrodes 50, two electrical connectors 52, two further contact areas 58, two flexible foils 60 and two conductors 62, one on the left-hand side of the Figure and one on the right-hand side of the Figure. In other example electrowetting display devices, there may be one or more than two of some or all of these components. The number of each component may be selected in dependence on the design of the display device, such as the size of the display device or the number of electrowetting elements in the array of electrowetting elements. For example, for a relatively large display device, the resistance of the second electrode 19 may be such that there is a potential difference between a first portion of the second electrode 19 close to an electrical connector 52 and a second portion of the second electrode 19 further from the electrical connector 52. This may cause electrowetting elements overlapped by the second portion of the second electrode 19 to display a different display effect than a desired display effect, due to a different potential difference between the second electrode 19 and the respective electrowetting element electrode 17 than expected. To avoid this, a further electrical connector and/or further electrical or electronic components may be positioned close to the second portion of the second electrode 19 so that the first and the second portion of the second electrode 19 are at substantially the same potential, for example with a potential that differs by less than or equal to 5%, 10% or 20%.

In examples, such as that of FIG. 5, the array of electrowetting elements includes a plurality of first electrowetting elements and a plurality of second electrowetting elements, although in other examples the array of electrowetting elements may not include second electrowetting elements. For example, the array of electrowetting elements may solely include first electrowetting elements. The first electrowetting elements may be electrowetting elements similar to or the same as the electrowetting element 2 described with reference to FIG. 1 and may each include an electrowetting element electrode and a switching element connected to the electrowetting element electrode. For example, the first electrowetting elements may be used to provide a respective display effect based on display device data so that, together, the first electrowetting elements display a desired image. The second electrowetting elements in examples do not include a switching element. For example, the second electrowetting elements may be considered to be so-called "dummy" pixels, which are not used to provide a display effect. The structure of the first and second electrowetting elements according to examples are described in more detail below with reference to FIGS. 6 and 7, and FIGS. 8 and 9 respectively.

The plurality of second electrowetting elements may be located between the plurality of first electrowetting elements and the seal. For example, the plurality of second electrowetting elements may at least partly surround the plurality of first electrowetting elements. For example, the second electrowetting elements may be arranged to border at least part of one, two, three, or more, for example, all, sides of the plurality of first electrowetting elements. FIG. 5 shows such an arrangement. In FIG. 5, the plurality of first electrowetting elements include or are associated with a third region R3 of the first support plate 5 and the plurality of second electrowetting elements include or are associated with a fourth region R4 of the first support plate 5. The third region R3 is entirely surrounded by the fourth region R4 in this example, and the seal 46 surrounds both the third and fourth regions R3, R4, with the fourth region R4, between the seal 46 and the third region R3. References to an electrowetting element including or being associated with a region of the first support plate for example refer to the portion of first fluid of the electrowetting element lying between the second support plate and the region of the first support plate, for example, so that the portion of first fluid is at least partly in contact with the region of the first support plate. For example, where the electrowetting element has an electrowetting element electrode, the electrowetting element electrode may lie in the region of the first support plate for an electrowetting element located in that region. In other examples, the plurality of second electrowetting elements may not surround the plurality of first electrowetting elements or there may be a different number of second electrowetting elements surrounding the plurality of first electrowetting elements on different sides. For example, there may be x rows of second electrowetting elements bordering or along a first side and a second side of the plurality of first electrowetting elements and y columns of second electrowetting elements along a third side and a fourth side of the plurality of first electrowetting elements, where x and y are integers and x is not equal to y, with the first and second sides and third and fourth sides lying opposite each other, such that the third and fourth sides are both between the first and second sides.

In examples in which the electrowetting display device is incorporated as part of an apparatus such as the apparatus 99 of FIG. 1, the plurality of first electrowetting elements may be located to be viewable through the window of the apparatus and the plurality of second electrowetting elements may be located so that they are not viewable through the window. For example, the plurality of second electrowetting elements may be overlapped or covered by the frame of the housing element, which may be opaque to visible light.

By including first and second electrowetting elements in the electrowetting display device, for example with the plurality of second electrowetting elements at least partly surrounding the plurality of first electrowetting elements, the display quality of the display device may be improved as this arrangement may facilitate the uniform or homogeneous filling of the first electrowetting elements (used to provide an image) with the first and/or second fluid. For example, it can be difficult to adequately fill electrowetting elements at an edge or outside portion of an array of electrowetting elements with first and/or second fluids during manufacture. These outer electrowetting elements may therefore include less of the first and/or second fluids than a desired amount. This can adversely affect the display effect obtainable using these outer electrowetting elements, which can lead to undesirable edge effects when the display device is used to display an image. By arranging a plurality of second electrowetting elements for example in an edge or outside portion of the array of electrowetting elements, for example to at least partly surround the plurality of first electrowetting elements, but not using the second electrowetting elements for providing a display effect, any underfill of the second electrowetting elements should not have an adverse effect on the display effect. For example, the first electrowetting elements in a central portion of the display device may be more homogeneously filled with the first and/or second fluid than would otherwise be possible without the second electrowetting elements. The display quality of the electrowetting display device may therefore be improved.

In examples, at least one second electrowetting element of the plurality of second electrowetting elements includes the conductor. FIG. 5 shows such an example. In FIG. 5, the conductor 62 is located in second electrowetting elements located to cover the fourth region of the first support plate 5. By positioning the conductor at least partly in the array of electrowetting elements, for example in at least one second electrowetting element, the conductor can be connected from the first electrode 50 in the first region R1 to the electrical component in the second region R2 without having to provide extra or additional space on the first support plate 5 solely for the conductor. A smaller border region of the first support plate 5 may therefore be used than would otherwise be needed. This can reduce costs, for example associated with materials and manufacturing.

Figure 6:
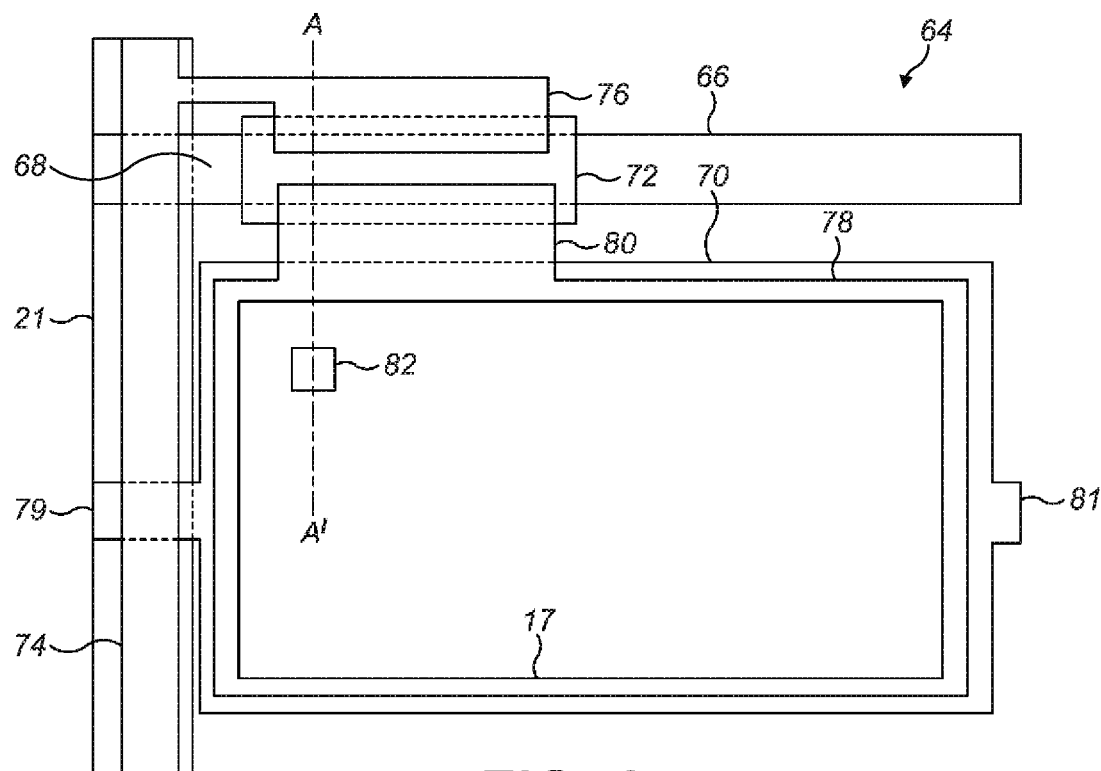
FIG. 6 shows schematically part of an example first electrowetting element in plan view.
Figure 7:
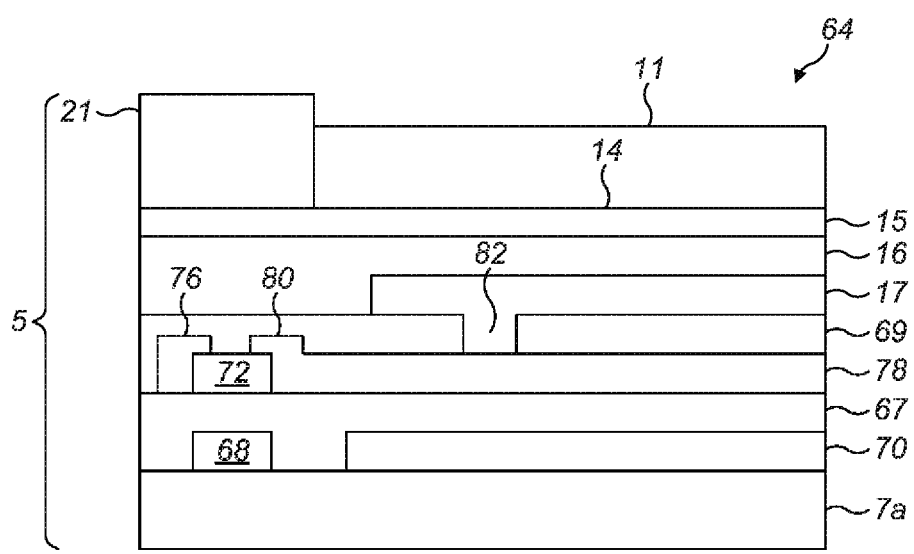
FIG. 7 shows schematically a cross-section of part of the example first electrowetting element of FIG. 6 along the line A-A' of FIG. 6.

FIGS. 6 and 7 show a schematic example of a first electrowetting element 64, for example a first electrowetting element 64 that may be positioned in the third region R3 of the first support plate 5 of FIG. 5. FIG. 6 shows the example first electrowetting element 64 schematically in plan view and FIG. 7 shows schematically a cross-section of part of the example first electrowetting element 64 of FIG. 6 along the line A-A' of FIG. 6. The first electrowetting element 64 of FIGS. 6 and 7 is similar to the electrowetting element 2 of FIG. 2 but with circuitry illustrated in greater detail. Features of FIGS. 6 and 7 similar to FIG. 2 are labelled with the same reference numerals; corresponding descriptions apply. It is to be appreciated that a dashed line indicates a structure lying below the plane of the drawing. The first electrowetting element 64 in examples is an electrowetting element of an array of electrowetting elements arranged as a matrix of n rows and m columns, for example as described above with reference to FIG. 1. The array of electrowetting elements typically has a plurality of row lines and a plurality of column lines, such as the row and column lines described above with reference to FIG. 4. Each row line of the plurality of row lines passes through electrowetting elements of a respective row of the n rows and each column line of the plurality of column lines passes through electrowetting elements of a respective column of the m columns. For example, each row line may be a gate line or connector for connection to the gate of a TFT or to a diode and each column line may be a source line or connector for connection to the source of a TFT or to a diode. Similarly to the first and conductors described above, any of the row and column lines may for example be formed as a strip of metal, for example having an elongate and flattened form, e.g. a form which is relatively thin in thickness compared with a length and width dimension. A form of any of the row and column lines may follower a perimeter of an electrowetting element of the array of electrowetting elements, which may have any shape of a polygon.

In the example of FIGS. 6 and 7, a row line 66 passes through the first electrowetting element 64. The row line 66 is for example located on a surface of the substrate 7a of the first support plate 5, although in examples there may be one or more layers between the row line 66 and the substrate 7a. The row line 66 in the example of FIGS. 6 and 7 comprises a portion that is considered to act as a gate terminal 68 of a thin film transistor. There is an electrically conductive plate 70 in the same layer as the row line 66 in the example of FIGS. 6 and 7. The electrically conductive plate 70 functions as a lower plate of a storage capacitor of the first electrowetting element 64, for example a first plate of the storage capacitor Cs described with reference to FIG. 4. The electrically conductive plate 70 in this example is connected to a storage control line 79 for supplying a potential Vstorage to the electrically conductive plate 70. The storage control line 79 may be connected to a voltage generator or voltage source such as a display driver, for example the display driver for supplying the potential to the second electrode 19, or a timing and control printed circuit board. Vstorage may be different from or substantially the same as the potential applied to the second electrode 19. The electrically conductive plate 70 may be connected to other electrically conductive plates of other electrowetting elements by a storage line 81, which is for example an electrically conductive component such as a flexible foil. In this way, a common potential may be supplied from the storage control line 79 to a plurality of electrically conductive plates of storage capacitors of respective electrowetting elements, using the storage line 81. In other examples, the electrically conductive plate 70 need not be present.

A semiconducting channel 72, for example comprising amorphous silicon, is located over the row line 66 in FIGS. 6 and 7. The first electrowetting element 64 also includes a source line 74, which includes a portion considered to act as a source terminal 76 of the thin film transistor, and a drain layer 78, which includes a portion considered to act as a drain terminal 80 of the thin film transistor. The semiconducting channel 72 may, for example, be positioned between the source terminal 76 and the row line 66 and between the drain terminal 80 and the row line 66 and typically connects the source terminal 76 to the drain terminal 80. Thus, in the example of FIG. 6, the first electrowetting element 64 includes a thin film transistor (TFT) having a gate terminal 68, a source terminal 76 and a drain terminal 80. The drain, source and gate terminals may for example be formed of any of molybdenum (Mo), an alloy including molybdenum (Mo) and chromium (Cr), or aluminium (Al). There may be one or more layers between the layer including the row line 66 and the layer including the source line 74 and the drain layer 78, for example at least one layer of dielectric material such as silicon nitride or silicon dioxide. In this example, as described with reference to FIG. 7 below, there is a first insulating layer 67 between the layer including the row line 66 and the layer including the drain layer 78 (not shown in FIG. 6). In other examples, the first electrowetting element may not include the thin film transistor. The first electrowetting element may instead include a different switching element such as a diode.

The first electrowetting element 64 in FIGS. 6 and 7 also includes an electrowetting element electrode 17, which is similar to the electrowetting element electrode 17 described above with reference to FIG. 2. The electrowetting element electrode 17 is connected to the drain terminal 80 of the thin film transistor so that a potential can be applied to the electrowetting element electrode 17 using the thin film transistor, using the row and column lines 66, 74. In the example of FIGS. 6 and 7, the first electrowetting element 64 includes a second insulating layer 69 between the drain layer 78 and the electrowetting element electrode 17 (not shown in FIG. 6, for clarity). The second insulating layer 69 may for example be formed of or include a dielectric material, for example an inorganic material such as silicon dioxide or silicon nitride. The drain layer 78 and the electrowetting element electrode 17 are connected through a via 82, sometimes referred to as a contact hole, which is for example a substantially vertical electrical contact e.g. with an angle of within plus or minus 20 degrees from the vertical, through the second insulating layer 69, although in other examples, the thin film transistor or other switching element may be connected to the electrowetting element electrode with a different arrangement.

The first electrowetting element 64 also includes a third insulating layer (shown in FIG. 7 but not illustrated in FIG. 6, for clarity), which in this example includes the hydrophobic layer 15 and the dielectric layer 16 described above with reference to FIG. 2. The third insulating layer is, for example, located on or to cover the layer including the electrowetting element electrode, although there may be at least one layer between the electrowetting element electrode and the third insulating layer. A portion of the first fluid 11 is in contact with a surface 14 of the hydrophobic layer 15 in the example of FIGS. 6 and 7 (shown in FIG. 7). A wall 21, such as the wall 21 described with reference to FIG. 2, is located on the hydrophobic layer 15. In examples, the first electrowetting element 64 includes a wall positioned along each side of the first electrowetting element 64, for example such that the wall aligns or overlaps with a boundary surrounding the first electrowetting element 64. FIG. 6 illustrates a wall 21 positioned along a left side of the first electrowetting element 64 and FIG. 7 illustrates a wall 21 positioned along a top side of the first electrowetting element 64. The wall 21 of FIG. 6 is not shown in FIG. 7 and vice versa, for clarity. It is to be appreciated that the first electrowetting element 64 may include other walls not illustrated in FIGS. 6 and 7, for example walls 21 along each side of the first electrowetting element 64, as noted above. In other examples, the wall 21 may be a continuous wall positioned along one, some or all sides of the first electrowetting element. In examples, at least one of the walls of electrowetting elements of the array of electrowetting elements, such as first electrowetting elements, may partly or fully overlap with a row line or a column line. FIGS. 6 and 7 show such an example. In FIGS. 6 and 7, each of the column line 74 and the row line 66 are completely overlapped by a respective wall 21 (as shown in FIGS. 6 and 7 respectively). The first electrowetting element 64 further includes the second fluid 12 (not shown in FIGS. 6 and 7).

Figure 8:
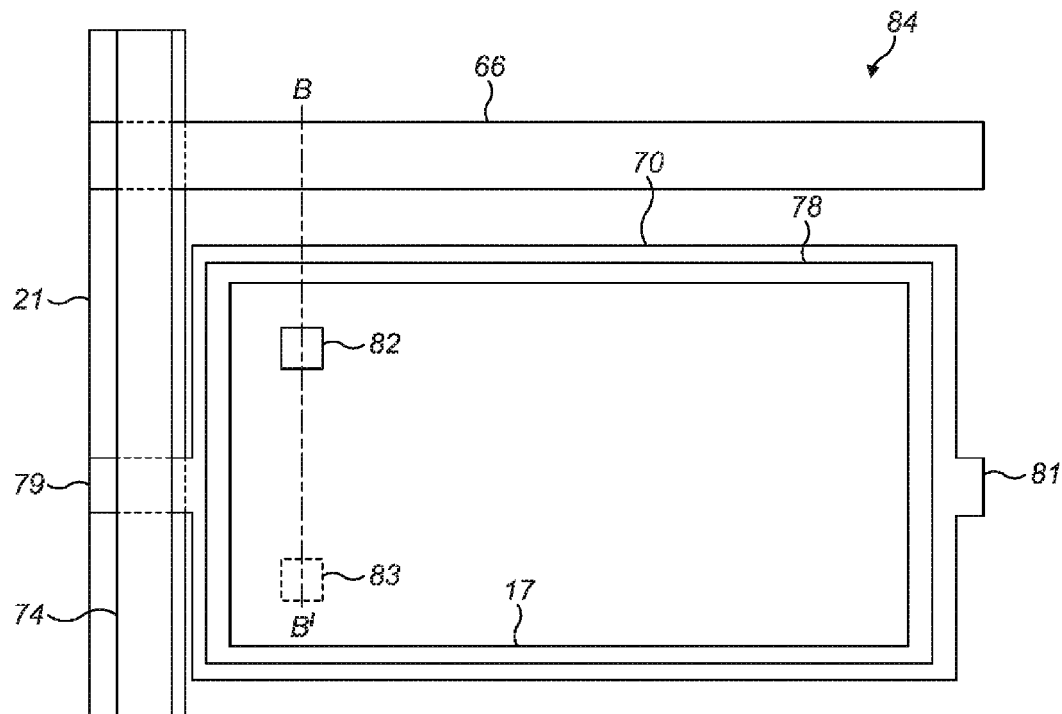
FIG. 8 shows schematically part of an example second electrowetting element in plan view.
Figure 9:
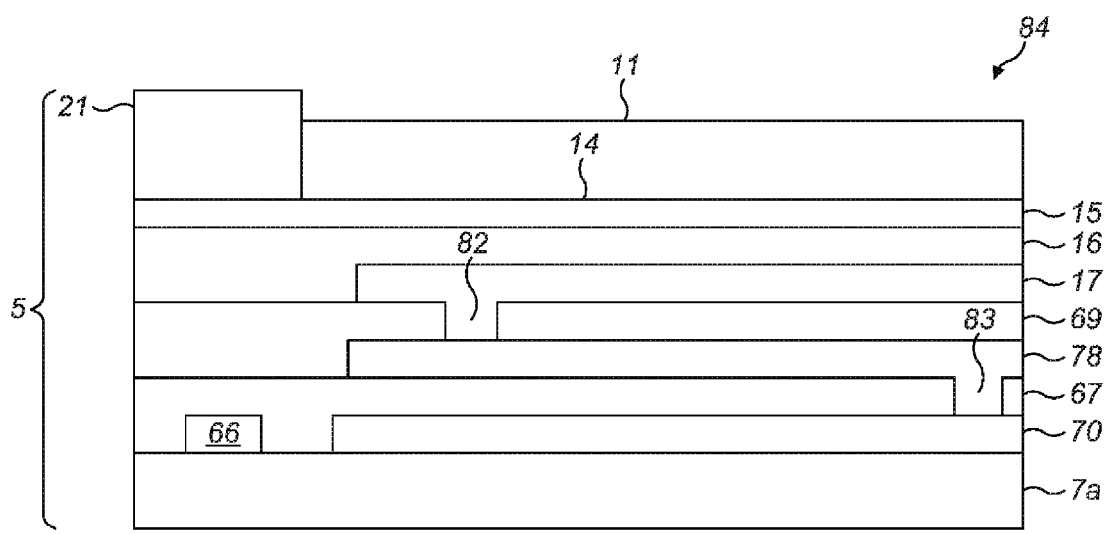
FIG. 9 shows schematically a cross-section of part of the example second electrowetting element of FIG. 8 along the line B-B' of FIG. 8.

FIG. 8 shows a schematic example of a second electrowetting element 84 in plan view and FIG. 9 shows schematically a cross-section of part of the example second electrowetting element of FIG. 8 along the line B-B' of FIG. 8. Features of the second electrowetting element 84 of FIGS. 8 and 9 similar to those of the first electrowetting element 64 of FIGS. 6 and 7 are labelled with the same reference numerals; corresponding descriptions should be taken to apply. As for FIGS. 6 and 7, is to be appreciated that a dashed line indicates a structure lying below the plane of the drawing.

Similarly to the first electrowetting element 64, the second electrowetting element 84 has a row line 66 and a column line 74 passing through it. With the electrowetting elements arranged in a matrix, for example with the second electrowetting elements at last partly surrounding the first electrowetting elements, at least one of the row line 66 and the column line 74 may pass through the second electrowetting element 84 and further second electrowetting elements and/or at least one first electrowetting element, such as the first electrowetting element 64 of FIGS. 6 and 7. However, unlike the first electrowetting element 64 of FIGS. 6 and 7, the second electrowetting element 84 of FIGS. 8 and 9 does not include a thin film transistor and therefore does not include a gate terminal, a source terminal and a drain terminal. Instead, the source line 74 extends along a side of the second electrowetting element 84 and is disconnected from both an electrically conductive plate 70 and an electrowetting element electrode 17. The electrically conductive plate 70 is similar to that of FIGS. 6 and 7 and for example receives a potential Vstorage from the storage control line 79 and is connected to one or more further electrically conductive plates of respective other electrowetting elements by a storage line 81. In the example of FIGS. 8 and 9, the second electrowetting element 84 includes a via 83 in a first insulating layer 67 to connect the electrically conductive plate 70 to the drain layer 78 (which in this example is not connected to a TFT, as no TFT is present). A via 82 in a second insulating layer 69 connects the drain layer 78 to the electrowetting element electrode 17. In other examples, the electrowetting element electrode 17 may be connected differently to the electrically conductive plate 70 or there may be no electrowetting element electrode 17 and/or no electrically conductive plate 70 in the second electrowetting element 84.

As for the example first electrowetting element 64 of FIGS. 6 and 7, the dielectric layer 16 and the hydrophobic layer 15 described with reference to FIG. 2 are arranged on the electrowetting element electrode 17, with the portion of the first fluid 11 in contact with a surface 14 of the hydrophobic layer 15. The wall 21 overlaps the row line 66 in the example of FIGS. 8 and 9 (as shown in FIG. 9) and also overlaps the source line 74 (as shown in FIG. 8). The wall 21 shown in FIG. 8 is not shown in FIG. 9, for clarity, and vice versa. It is to be appreciated that the wall of FIG. 9 is nevertheless present in the second electrowetting element 84 of FIG. 8, and vice versa. The second electrowetting element 84 may also include further walls such as one or more walls along each side of the second electrowetting element 84. As for the first electrowetting element, the wall 21 may be a continuous wall positioned along one, some or all sides of the second electrowetting element. The second electrowetting element 84 also includes the second fluid 12 (not illustrated in FIGS. 8 and 9, for clarity).

In FIGS. 6 to 9, various layers of the first support plate 5 of the example first and second electrowetting elements 64, 84 have a varying or non-uniform thickness. For example, the second insulating layer 69 is illustrated as thicker in a direction parallel to a plane of the substrate 7a in a region corresponding to the via 82. However, in other examples, one or more of the layers of the first support plate 5 may be of a constant or uniform or substantially uniform thickness, for example with a variation in thickness of less than or equal to 5%, 10% or 20% an average thickness of the layer. For example, a layer covering, deposited or formed on or supported by an underlying layer may follow a pattern of the underlying layer, for example such that the layer copies, or has a height difference corresponding to, a height difference in a surface of the underlying layer with respect to the substrate 7a.

In the example of FIGS. 8 and 9, the electrowetting element electrode 17 in the second electrowetting element 84 is at the same potential as the electrically conductive plate 70. In examples in which the electrically conductive plate 70 is at the same or substantially the same potential as the second electrode 19, for example within 5%, 10% or 20% of the potential of the second electrode 19, the portion of the first fluid 11 in the second electrowetting element 84 will be spread out to cover the display area of the second electrowetting element 84, and will not be retracted. In other examples in which there is a potential difference between the electrically conductive plate 70 and the second electrode 19, the portion of the first fluid 11 may be at least partially retracted or contracted and may contact only a part of the display area of the second electrowetting element 84.

In examples, a row line of the plurality of row lines or a column line of the plurality of column lines, such as the row line 66 and column line 74 described above with reference to FIGS. 8 and 9 and passing through at least one second electrowetting element 84, may be used as the conductor 62. With this arrangement, existing components of the electrowetting display device can be used, for example, to supply a potential from the electrical component to the first electrode, and to the second electrode using the electrical connector. There is, for example, no need to include additional components for this purpose, as components which are provided as part of the manufacturing of the array of electrowetting elements can be used. Such an arrangement can therefore simplify the manufacture of the display device as existing manufacturing techniques can be used with little modification. Furthermore, the border region may be smaller than otherwise, as the row or column lines, which are within the array of electrowetting elements, can be used to provide the function of the conductor and no further space needs to be provided for additional components.

In other examples, the conductor need not be a row line or a column line. For example, the conductor may be another electrically conductive line or connector for example at least partly within at least one second electrowetting element. In such cases, for example, where the first support plate has at least one first wall located along a first side of electrowetting elements of a row of the n rows and at least one second wall located along a second side of electrowetting elements of a column of the m columns, the conductor may be at least partly overlapped by the at least one first wall or the at least one second wall. In examples, a first portion and a second portion of a single wall, for example one continuous wall, may be considered to be a first wall and a second wall, respectively, as referred to herein.

Figure 10:
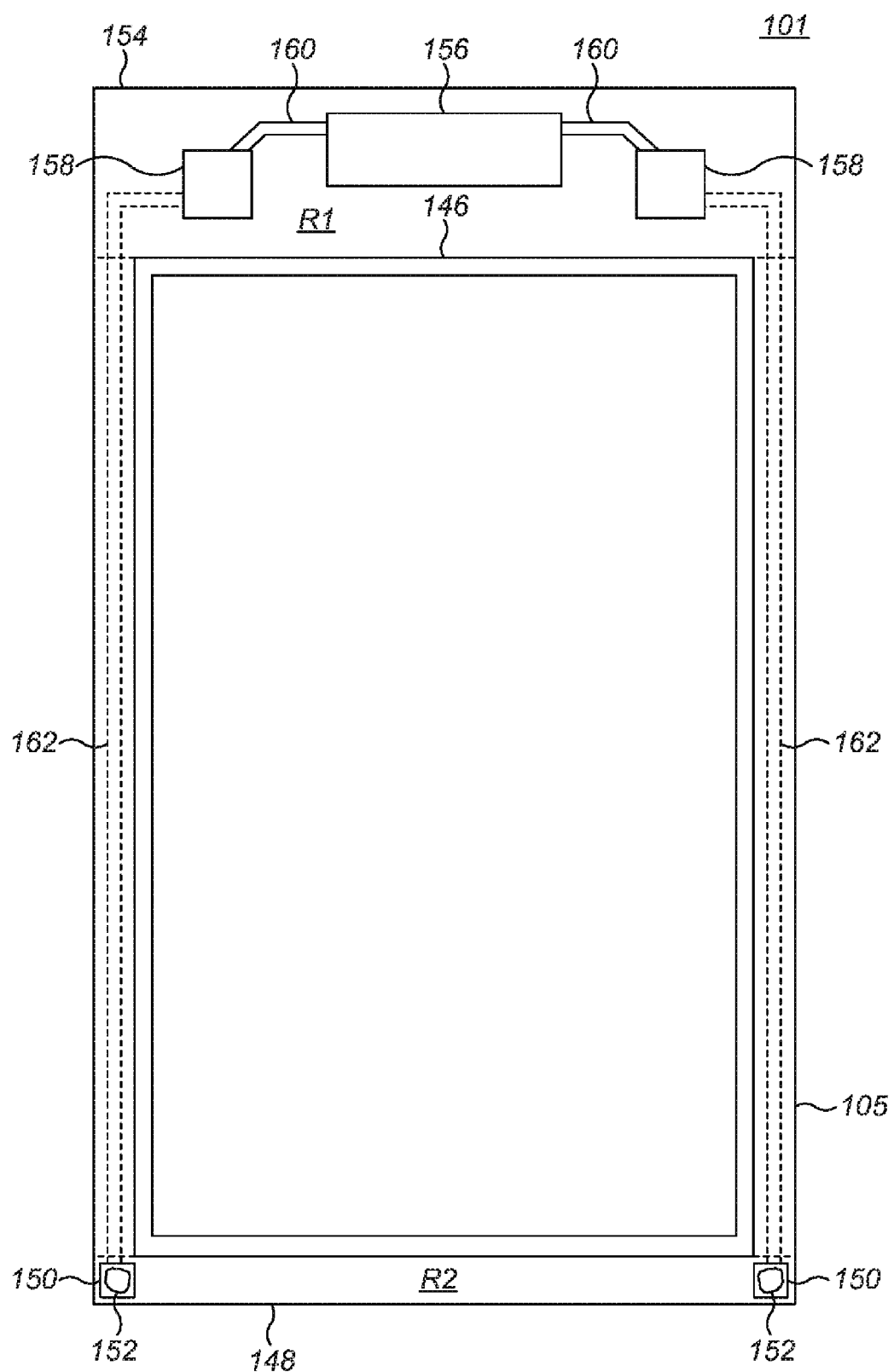
FIG. 10 shows schematically a plan view of a different example electrowetting display device.

In the example of FIG. 5, the conductor 62 is located at least partly in the array of electrowetting elements. However, in other examples, the conductor may be located outside the array of electrowetting elements and/or outside the seal. FIG. 10 shows such an example. FIG. 10 shows schematically a plan view of an electrowetting display device 101. The electrowetting display device 101 of FIG. 10 is similar to the electrowetting display device 1 of FIG. 5 except for the positioning of the conductor 62. Features of the electrowetting display device 101 of FIG. 10 similar to corresponding features of the electrowetting display device 1 of FIG. 5 are labelled with the same reference numeral incremented by 100; corresponding descriptions apply.

In FIG. 10, the conductor 162 passes along a side of the seal 146 from the first region R1 to the second region R2 but further from a central portion of a surface of the first support plate 5 than the seal 146.

Figure 11:
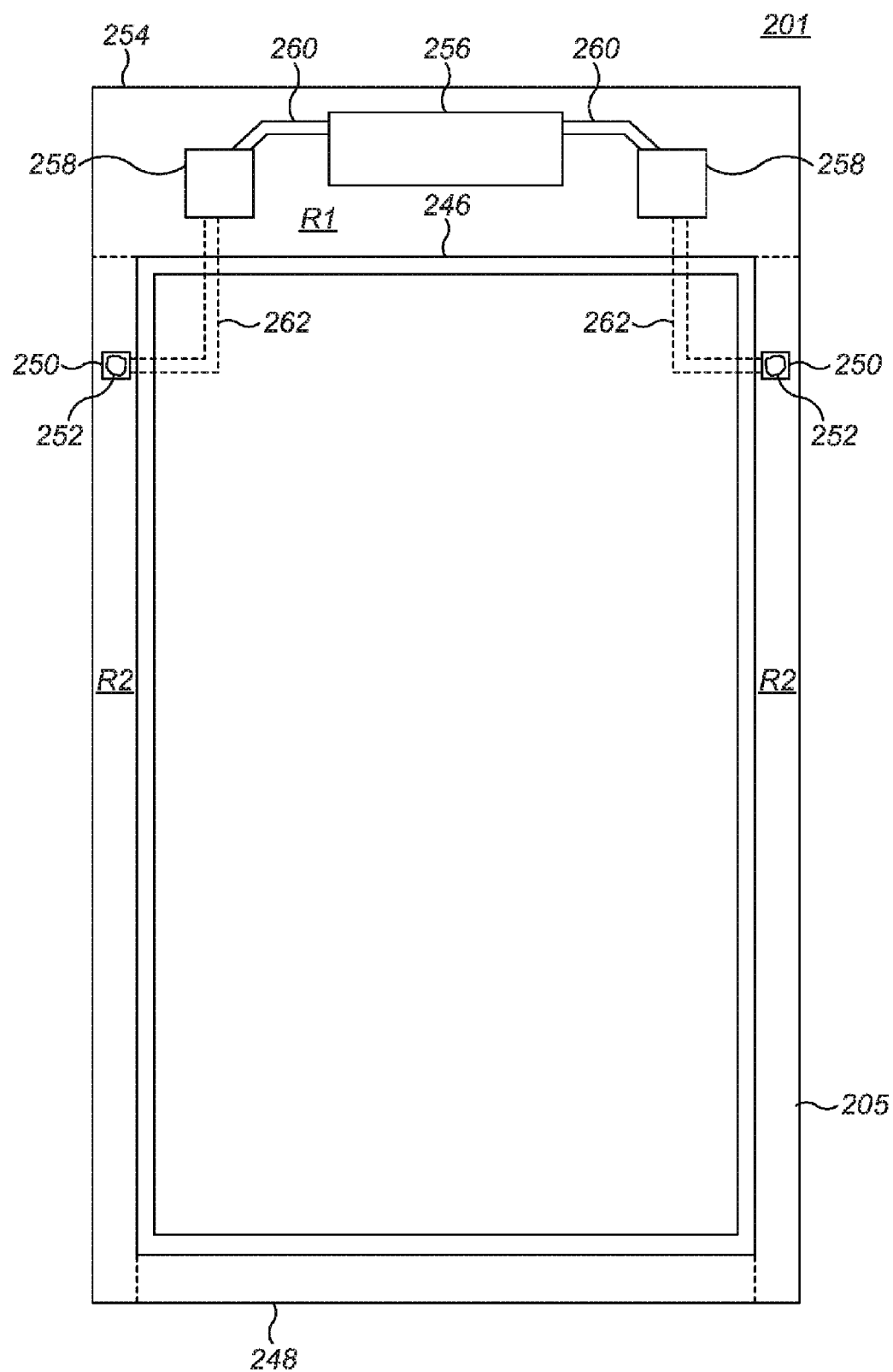
FIG. 11 shows schematically a plan view of a further example electrowetting display device.

FIG. 11 shows a further example of an electrowetting display device 201 according to examples. Features of the electrowetting display device 201 of FIG. 11 similar to corresponding features of the electrowetting display device 1 of FIG. 5 are labelled with the same reference numeral incremented by 200; corresponding descriptions should be taken to apply.

In FIG. 11, the first region R1 and the two second regions R2 are neighbouring and the first region R1 contacts each second region R2 at a respective boundary. In FIG. 11, the first electrode 250 and the electrical connector 252 are located closer to the electrical component of the display drivers in the driver contact area 256 than in the example of FIG. 5. Nevertheless, with the first and second regions R1, R2 being non-overlapping, the electrical connector 252 may still be sufficiently separated from the electrical component to avoid or reduce short circuits. In such cases, the first electrode 250 may be located such that the separation between the first electrode 250 and the electrical connector exceeds a predetermined distance for short circuits to be avoided. For example, the first electrode 250 may be located greater than or equal to 5 millimeters from the electrical connector.

Figure 12:
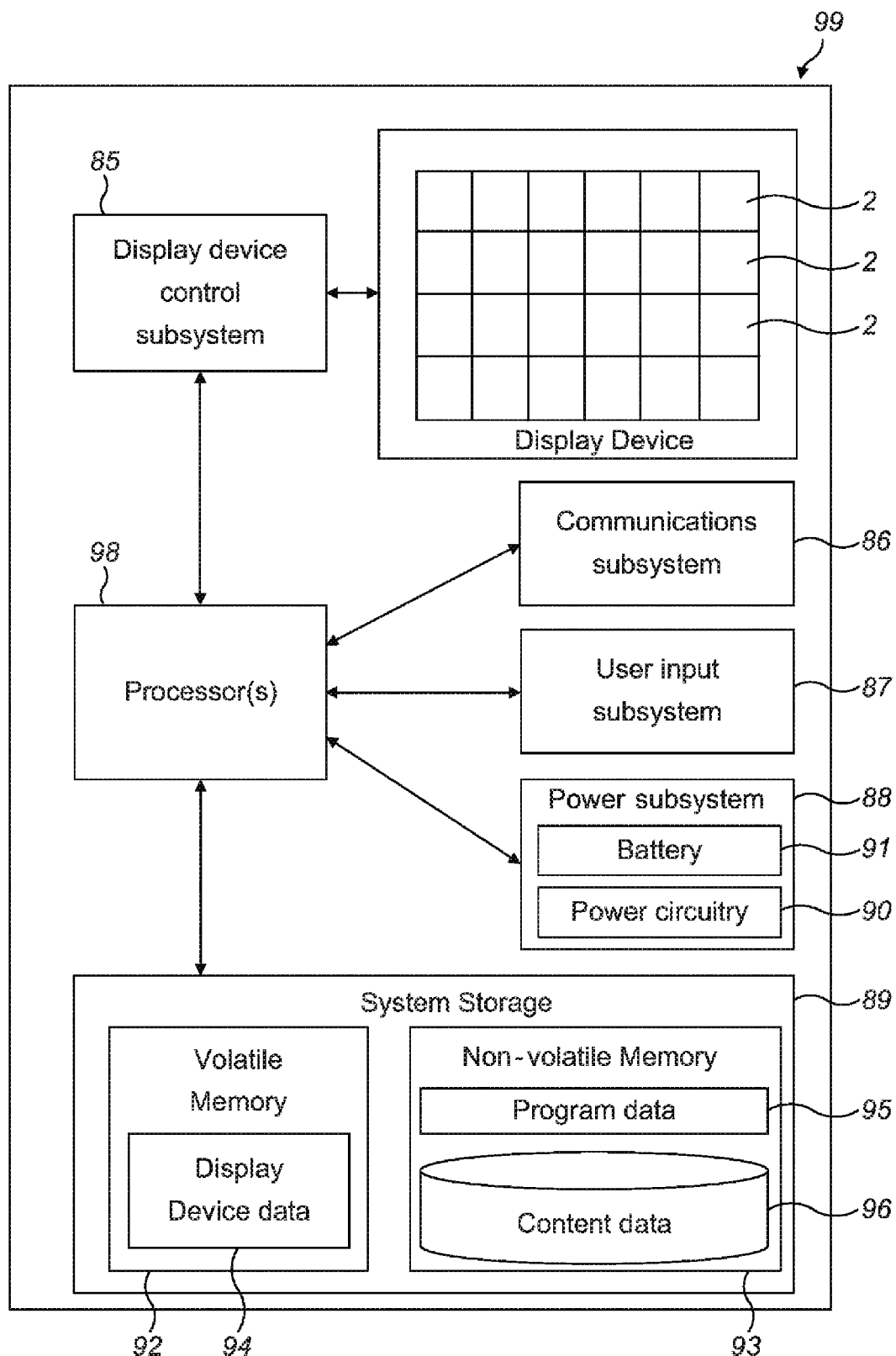
FIG. 12 shows a schematic system diagram of an example apparatus including an electrowetting display device.

A system diagram illustrating an example of a basic hardware architecture of an apparatus including an electrowetting display device according to examples described herein, such as the apparatus 99 described above with reference to FIG. 1, is shown in FIG. 12. The apparatus 99 includes at least one processor 98 connected to and therefore in data communication with for example: a display device control subsystem 85, a communications subsystem 86, a user input subsystem 87, a power subsystem 88 and system storage 89. The display device control subsystem is connected to and is therefore in data communication with the electrowetting display device 1. The at least one processor 98 is for example a general purpose processor, a microprocessor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration. The processor may be coupled, using one or more buses, to read information from or write information to one or more memories, for example those of the system storage 89. The at least one processor may additionally, or in the alternative, contain memory, such as processor registers.

The display device control subsystem 85 for example includes electrowetting element driver components, for use in applying a voltage to any of the electrowetting elements, to address different such electrowetting elements. In examples the electrowetting elements are configured according to an active matrix configuration and the display device control subsystem is configured to control switching elements such as thin film transistors (TFTs) of the display device 1 using circuitry to control the electrowetting elements. The circuitry may include signal and control lines. For example, the display device control subsystem 85 may include display drivers such as display column drivers and display row drivers.

The communications subsystem 86 for example is configured for the apparatus to communicate with for example a computing device using a data network, for example a computer network such as the Internet, a local area network, a wide area network, a telecommunications network, a wired network, a wireless network, or some other type of network. The communications subsystem 86 may further for example comprise an input/output (I/O) interface, such as a universal serial bus (USB) connection, a Bluetooth or infrared connection, or a data network interface for connecting the apparatus to a data network such as any of those described above. Content data as described later may be transferred to the apparatus using the communications subsystem.

The user input subsystem 87 may include for example an input device for receiving input from a user of the apparatus. Example input devices include, but are not limited to, a keyboard, a rollerball, buttons, keys, switches, a pointing device, a mouse, a joystick, a remote control, an infrared detector, a voice recognition system, a bar code reader, a scanner, a video camera (possibly coupled with video processing software to, e.g., detect hand gestures or facial gestures), a motion detector, a microphone (possibly coupled to audio processing software to, e.g., detect voice commands), or other device capable of transmitting information from a user to the device. The input device may also take the form of a touch-screen associated with the display device, in which case a user responds to prompts on the display device by touch. The user may enter textual information through the input device such as the keyboard or the touch-screen.

The apparatus may also include a user output subsystem (not illustrated) including for example an output device for providing output to a user of the apparatus. Examples include, but are not limited to, a printing device, an audio output device including for example one or more speakers, headphones, earphones, alarms, or haptic output devices. The output device may be a connector port for connecting to one of the other output devices described, such as earphones.

The power subsystem 88 for example includes power circuitry 90 for use in transferring and controlling power consumed by the apparatus. The power may be provided by a mains electricity supply or from a battery 91, using the power circuitry. The power circuitry may further be used for charging the battery from a mains electricity supply.

The system storage 89 includes at least one memory, for example at least one of volatile memory 92 and non-volatile memory 93 and may comprise a non-transitory computer readable storage medium. The volatile memory may for example be a Random Access Memory (RAM). The non-volatile (NV) memory may for example be a solid state drive (SSD) such as Flash memory, or Read Only Memory (ROM). Further storage technologies may be used, for example magnetic, optical or tape media, compact disc (CD), digital versatile disc (DVD), Blu-ray or other data storage media. The volatile and/or non-volatile memory may be removable or non-removable.

Any of the memories may store data for controlling the apparatus, for example components or subsystems of the apparatus. Such data may for example be in the form of computer readable and/or executable instructions, for example computer program instructions. Therefore, the at least one memory and the computer program instructions may be configured to, with the at least one processor, control a configuration of a portion of the first fluid of an electrowetting element of the array of electrowetting elements, for example to control a display effect provided by the electrowetting display device.

In the example of FIG. 12, the volatile memory 92 stores for example display device data 94 which is indicative of display effects to be provided by the display device 1. The processor 98 may transmit data, based on the display device data, to the display device control subsystem 85 which in turn outputs signals to the display device for applying voltages to the electrowetting elements, for providing display effects from the display device. The non-volatile memory 93 stores for example program data 95 and/or content data 96. The program data is for example data representing computer executable instructions, for example in the form of computer software, for the apparatus to run applications or program modules for the apparatus or components or subsystems of the apparatus to perform certain functions or tasks, and/or for controlling components or subsystems of the apparatus. For example, application or program module data includes any of routines, programs, objects, components, data structures or similar. The content data is for example data representing content for example for a user; such content may represent any form of media, for example text, at least one image or a part thereof, at least one video or a part thereof, at least one sound or music or a part thereof. Data representing an image or a part thereof is for example representative of a display effect to be provided by at least one electrowetting element of the electrowetting display device. The content data may include data representing a library of content, for example a library of any of books, periodicals, newspapers, movies, videos, music, or podcasts, each of which may be represented by a collection of data which represents for example one book or one movie. Such a collection of data may include content data of one type, but may instead include a mixture of content data of different types, for example a movie may be represented by data including at least image data and sound data.

A method of manufacturing an electrowetting display device according to examples, such as the electrowetting display devices described above in examples, will now be described with reference to FIG. 13. Features referred to with reference to FIG. 13 are similar to those described above with reference to FIGS. 1 to 12; corresponding descriptions apply.

During the manufacturing process, the first support plate and/or the second support plate may be manufactured entirely, or may be provided during the manufacturing process as a partly or completely assembled support plate.

When manufacturing the first support plate 5 according to examples, the substrate 7a is provided. In examples such as that of FIG. 13, the method includes depositing a first material on a first underlying layer of a first support plate and patterning the first material to form a first electrode in a first region of the first support plate, such as the first region described above in examples. References herein to deposition of a material on an underlying layer are envisaged to encompass deposition of a material directly on, and therefore in contact with, the underlying layer or deposition of the material such that there is an intervening layer or layers between the material and the underlying layer such that the material is not in direct contact with the underlying layer, but is nevertheless generally supported by the underlying layer. For example, the material may overlap or be located above the underlying layer. The first underlying layer may for example be the substrate 7a, the layer including the electrowetting element electrodes 17 or another layer such as a layer of dielectric or insulating material. Other electrical components of the electrowetting elements, such as the components of the first and second electrowetting elements illustrated in FIGS. 6 to 9, may then be provided.

Figure 13:
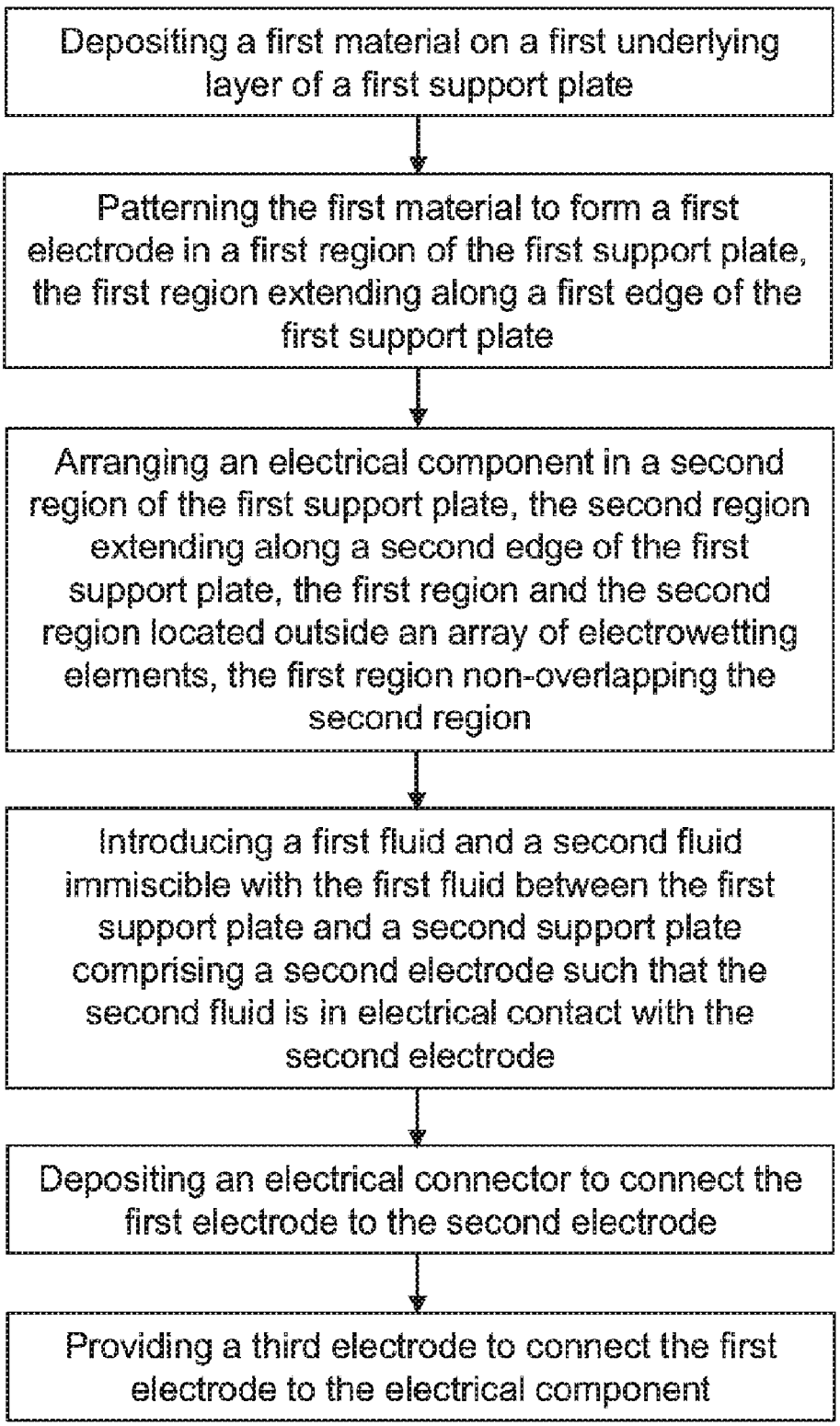
FIG. 13 is a flow diagram relating to examples of a method of manufacturing an electrowetting display device.

The method of FIG. 13 further includes arranging an electrical component in a second region of the first support plate, such as the second region described above in examples. The electrical component may for example be arranged, deposited or patterned on a surface of a layer of the first support plate, for example so that the electrical component forms the outermost layer of the first support plate. Alternatively, further layers may be deposited on top of the electrical component such that the electrical component is positioned between two layers of the first support plate. The method of arranging the electrical component will depend on the nature of the electrical component; any suitable method may be used, as the skilled person will appreciate.

In examples, the conductor is provided to connect the first electrode to the electrical component. The conductor may be as described above in examples. The method may further include depositing a second material on a second underlying layer of the first support plate, the first electrode located between the first underlying layer and the second underlying layer, and patterning the second material to form the conductor. The first material and the second material may be the same. For example, the first material and the second material may be ITO (indium tin oxide), as will be appreciated by the skilled person. The second underlying layer may for example be an insulating or dielectric layer lying between the first electrode and the conductor. In other examples, the first electrode and the conductor may be part of the same layer.

The electrowetting element electrodes, the first and conductors, and other control lines such as the row and column lines, each may be deposited or provided using for example a physical vapour deposition (PVD) technique such as sputtering, with an appropriate mask, as would be appreciated by the skilled person.

Subsequently, the insulating layer 13, which in this example includes the dielectric layer 16 and the hydrophobic layer 15, is provided on the electrowetting element electrode 17. The dielectric layer may for example be provided using Chemical Vapor Deposition (CVD) or Physical Vapor Deposition (PVD) for example sputter deposition or electron beam evaporation where temperature, pressure and power are controlled appropriately, as would be understood by the skilled person. The hydrophobic layer 15 may then be provided on the dielectric layer, or in other examples on the electrowetting element electrode, for example by a wet coating process such as slit coating, flexoprinting, spin coating or dip coating as is well known in the art. The hydrophobic layer in examples is a continuous uninterrupted layer of the first support plate common to all electrowetting elements. A layer of wall material may be provided on the hydrophobic layer 15, for example using a slot die coating or a spincoating process, and then patterned using a lithographic process to form the walls 21. The wall material may comprise an organic and/or a photoresist material, such as SU8.

The second support plate may be manufactured similarly to the first support plate, for example, by providing the second electrode 19 on the substrate 7b for example using a physical vapour deposition (PVD) technique such as sputtering, with an appropriate mask.

In the example method of FIG. 13, the first fluid and the second fluid are introduced between the first support plate and the second support plate, for example using any suitable method. A seal may be arranged between the first support plate and the second support plate, with the seal surrounding the array of electrowetting elements for example. As will be appreciated by the skilled person, the seal may be applied as a fluid and subsequently hardened, for example by curing using ultraviolet light. For example, the seal may be an epoxy resin such as XNR 5570, available from Nagase & Co., Ltd., 5-1, Nihonbashi-Kobunacho, Chuo-ku, Tokyo 103-8355, Japan. The seal may be cured after the seal is brought into contact with both the first and second support plates and may be cured after the first and second fluids are introduced between the support plates.

In examples, the first fluid is dispensed on the hydrophobic layer of the first support plate and the second fluid is dispensed to form a layer on top of the first fluid before the first and second support plates are joined together by the seal. However, in other examples, the seal may be arranged between the first and second support plates before the first and second fluids are introduced between the first and second support plates, for example where the first and second fluids are injected through a gap in the seal, which is subsequently filled in or closed.

The method in the example of FIG. 13 further includes depositing an electrical connector to connect the first electrode to a second electrode in electrical contact with the second fluid, such as the second electrode described above. The electrical connector in examples may be deposited so that it is in contact with a first surface of the first support plate in the first region, for the electrical connector to contact the first electrode located in the first region. The electrical connector is for example deposited or dispensed as a paste, for example by injection of the electrical connector to a desired location. A paste is generally a fluid, which is typically relatively viscous, for example so that the paste may behave as a solid if a low level of stress is applied and as a liquid if a higher level of stress is applied. A paste may for example include a liquid component, such as a carrier fluid, and a solid component, such as solid particles. Use of a paste may facilitate deposition of the electrical connector, for example where it is desired to deposit the electrical connector at a precise location. Such a paste may for example be dispensed using a needle. The seal and the electrical connector, for example in the form of a paste, may be deposited before the first and second support plates are connected. The seal may, for example, be deposited on one of the first support plate or the second support plate and the electrical connector may be deposited on the other of the first support plate or the second support plate before the support plates are brought together. The first and second support plates may subsequently be moved towards each other to connect the first electrode to the second electrode using the electrical connector and to connect the support plates together using the seal.

After deposition of the electrical connector, a carrier fluid of the paste may be evaporated to form the electrical connector connecting the first and second electrodes in the display device. Such an electrical connector, which is typically more solid than the paste deposited prior to evaporation of the carrier fluid, may provide a more reliable connection between the first and second electrodes than a more liquid or fluid electrical connector, that may for example flow or move if the display device is moved, e.g. by a user.

The above examples are to be understood as illustrative examples. Further examples are envisaged. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. An electrowetting display device comprising:
   a first fluid;
   an array of electrowetting elements, each electrowetting element of the array of electrowetting elements respectively comprising a portion of the first fluid;
   a first support plate comprising:
      a first region extending along a first edge of the first support plate;
      a second region extending along a second edge of the first support plate, the first region and the second region located outside the array of electrowetting elements, the first region non-overlapping the second region;
      a first electrode located in the first region; and
      an electrical component located in the second region;
   a second support plate comprising a second electrode;
   a second fluid immiscible with the first fluid, the first fluid and the second fluid located between the first support plate and the second support plate, the second fluid in contact with the second electrode;
   an electrical connector connecting the first electrode to the second electrode; and
   a conductor connecting the first electrode to the electrical component.

2. The electrowetting display device according to claim 1, wherein the first edge is opposite the second edge.

3. The electrowetting display device according to claim 1, wherein the conductor is located at least partly in the array of electrowetting elements.

4. The electrowetting display device according to claim 1, wherein the array of electrowetting elements is arranged in a matrix of n rows and m columns, the first support plate comprising:
   at least one first wall located along a first side of electrowetting elements of a row of the n rows; and
   at least one second wall located along a second side of electrowetting elements of a column of the m columns, the conductor at least partly overlapped by the at least one first wall or the at least one second wall.

5. The electrowetting display device according to claim 1, the first support plate comprising a substrate and a hydrophobic layer, the conductor located between the substrate and the hydrophobic layer.

6. The electrowetting display device according to claim 1, wherein the array of electrowetting elements comprises:
   a plurality of first electrowetting elements, each first electrowetting element of the plurality of first electrowetting elements respectively comprising:
      an electrowetting element electrode; and
      a switching element connected to the electrowetting element electrode; and
   a plurality of second electrowetting elements without a switching element,
   at least one second electrowetting element of the plurality of second electrowetting elements comprising the conductor.

7. The electrowetting display device according to claim 6, wherein the switching element of each first electrowetting element of the plurality of first electrowetting elements is a respective thin film transistor having:
   a gate terminal;
   a source terminal; and
   a drain terminal connected to the electrowetting element electrode of the respective first electrowetting element of the plurality of first electrowetting elements.

8. The electrowetting display device according to claim 6, wherein each second electrowetting element of the plurality of second electrowetting elements comprises a respective electrowetting element electrode connected to the conductor.

9. The electrowetting display device according to claim 6, comprising a plurality of vias, each via of the plurality of vias connecting an electrowetting element electrode of a respective second electrowetting element of the plurality of second electrowetting elements to the conductor.

10. The electrowetting display device according to claim 6, comprising a seal between the first support plate and the second support plate, the plurality of second electrowetting elements located between the plurality of first electrowetting elements and the seal.

11. The electrowetting display device according to claim 6, wherein the array of electrowetting elements is arranged in a matrix of n rows and m columns, the array of electrowetting elements comprising:
   a plurality of row lines, each row line of the plurality of row lines passing through electrowetting elements of a respective row of the n rows; and
   a plurality of column lines, each column line of the plurality of column lines passing through electrowetting elements of a respective column of the m columns,
   the conductor being a row line of the plurality of row lines or a column line of the plurality of column lines.

12. The electrowetting display device according to claim 6, wherein the electrical component comprises at least one of: a voltage generator, a display driver, a driver stage, a distributor, a display controller or a timing and control printed circuit board configured for use in applying a potential to the conductor.

13. The electrowetting display device according to claim 1, wherein the electrical component comprises at least one of: a voltage generator, a display driver, a driver stage, a distributor, a display controller or a timing and control printed circuit board.

14. The electrowetting display device according to claim 1, comprising a seal between the first support plate and the second support plate, the seal surrounding a periphery of the array of electrowetting elements.

15. The electrowetting display device according to claim 1, wherein the electrical connector comprises one or more of: electrically conductive particles, silver particles, an adhesive, balls comprising gold, or balls each comprising a gold surface respectively.

16. An apparatus comprising:
an electrowetting display device comprising:
a first fluid;
an array of electrowetting elements, each electrowetting element of the array of electrowetting elements respectively comprising a portion of the first fluid;
a first support plate comprising:
a first region extending along a first edge of the first support plate;
a second region extending along a second edge of the first support plate, the first region and the second region located outside the array of electrowetting elements, the first region non-overlapping the second region;
a first electrode located in the first region; and
an electrical component located in the second region;
a second support plate comprising a second electrode;
a second fluid immiscible with the first fluid, the first fluid and the second fluid located between the first support plate and the second support plate, the second fluid in contact with the second electrode;
an electrical connector connecting the first electrode to the second electrode; and
a conductor connecting the first electrode to the electrical component;
at least one processor; and
at least one memory comprising computer program instructions, the at least one memory and the computer program instructions configured to, with the at least one processor, control application of a voltage to an electrowetting element of the array of electrowetting elements to control a configuration of the portion of the first fluid of the electrowetting element.

17. The apparatus according to claim 16, wherein the first edge is opposite the second edge.

18. The apparatus according to claim 16, wherein the array of electrowetting elements comprises:
a plurality of first electrowetting elements, each first electrowetting element of the plurality of first electrowetting elements respectively comprising:
an electrowetting element electrode; and
a switching element connected to the electrowetting element electrode; and
a plurality of second electrowetting elements without a switching element,
at least one second electrowetting element of the plurality of second electrowetting elements comprising the conductor.

19. The apparatus according to claim 16, wherein the array of electrowetting elements is arranged in a matrix of n rows and m columns, the array of electrowetting elements comprising:
a plurality of row lines, each row line of the plurality of row lines passing through electrowetting elements of a respective row of the n rows; and
a plurality of column lines, each column line of the plurality of column lines passing through electrowetting elements of a respective column of the m columns,
the conductor being a row line of the plurality of row lines or a column line of the plurality of column lines.

20. A method of manufacturing an electrowetting display device comprising a first fluid and an array of electrowetting elements, each electrowetting element of the array of electrowetting elements respectively comprising a portion of the first fluid, the method comprising:
depositing a first material on a first underlying layer of a first support plate;
patterning the first material to form a first electrode in a first region of the first support plate, the first region extending along a first edge of the first support plate;
depositing an electrical component in a second region of the first support plate, the second region extending along a second edge of the first support plate, the first region and the second region located outside the array of electrowetting elements, the first region non-overlapping the second region;
introducing the first fluid and a second fluid immiscible with the first fluid between the first support plate and a second support plate comprising a second electrode, such that the second fluid is in contact with the second electrode;
depositing an electrical connector to connect the first electrode to the second electrode; and
providing a conductor to connect the first electrode to the electrical component.

21. The method according to claim 20, wherein the first edge is opposite the second edge.

22. The method according to claim 20, comprising:
depositing a second material on a second underlying layer of the first support plate, the first electrode located between the first underlying layer and the second underlying layer; and
patterning the second material to form the conductor.

23. The method according to claim 20, the depositing the electrical connector comprising depositing the electrical connector as a paste.

* * * * *